United States Patent
Long, III et al.

(10) Patent No.: US 10,608,945 B2
(45) Date of Patent: Mar. 31, 2020

(54) CREATING RULES FOR LABELED SERVERS IN A DISTRIBUTED NETWORK MANAGEMENT SYSTEM

(71) Applicant: Illumio, Inc., Sunnyvale, CA (US)

(72) Inventors: William R. Long, III, Morrisville, NC (US); Michael J. Carlton, Los Altos Hills, CA (US); Mukesh Gupta, Milpitas, CA (US); Paul J. Kirner, Palo Alto, CA (US)

(73) Assignee: Illumio, Inc., Sunnyvale, CA (US)

( * ) Notice: Subject to any disclaimer, the term of this patent is extended or adjusted under 35 U.S.C. 154(b) by 141 days.

(21) Appl. No.: 15/442,936

(22) Filed: Feb. 27, 2017

(65) Prior Publication Data
US 2017/0250915 A1   Aug. 31, 2017

Related U.S. Application Data

(60) Provisional application No. 62/300,831, filed on Feb. 27, 2016.

(51) Int. Cl.
*H04L 12/24* (2006.01)
*H04L 12/813* (2013.01)
(Continued)

(52) U.S. Cl.
CPC .......... *H04L 47/20* (2013.01); *H04L 41/0893* (2013.01); *H04L 43/0876* (2013.01); *H04L 67/16* (2013.01)

(58) Field of Classification Search
CPC . G06F 9/45533; G06F 9/5072; G06K 9/6218; G06K 9/6267; G06K 9/6292;
(Continued)

(56) References Cited

U.S. PATENT DOCUMENTS

| 6,587,876 B1 * | 7/2003 | Mahon | H04L 41/0893 709/203 |
|---|---|---|---|
| 2008/0005795 A1 * | 1/2008 | Acharya | H04L 63/0263 726/23 |

(Continued)

FOREIGN PATENT DOCUMENTS

WO   WO 2015076904   5/2015

OTHER PUBLICATIONS

PCT International Search Report and Written Opinion for PCT/US2017/019614, dated May 8, 2017, 14 Pages.

*Primary Examiner* — Kim T Nguyen
(74) *Attorney, Agent, or Firm* — Fenwick & West LLP

(57) ABSTRACT

A system enforces administrative domain wide policies specified using labels that describe characteristics of servers or services. A label comprises a label value describing a characteristic of one or more computing devices for a label dimension. The system infers label values for devices using features describing characteristics of the computing devices, for example, hardware characteristics, software characteristics, or connectivity characteristics. The system obtains communication information indicating the destination, source, volume, and duration of network traffic between computing devices. The system identifies providers of services and consumers of services based on the communication information. The system generates rules for regulating communications between computing devices and enforces the rules.

20 Claims, 10 Drawing Sheets

(51) Int. Cl.
*H04L 12/26* (2006.01)
*H04L 29/08* (2006.01)

(58) Field of Classification Search
CPC . H04L 12/4641; H04L 41/0893; H04L 45/04;
H04L 45/123; H04L 45/44; H04L 47/22;
H04L 47/2441; H04L 63/0263; H04Q
3/0062
See application file for complete search history.

(56) References Cited

U.S. PATENT DOCUMENTS

| | | | |
|---|---|---|---|
| 2010/0290485 A1 | 11/2010 | Martini et al. | |
| 2011/0252420 A1* | 10/2011 | Tung | G06F 9/5072 718/1 |
| 2013/0100849 A1* | 4/2013 | Szabo | G06K 9/6267 370/253 |
| 2014/0269333 A1* | 9/2014 | Boerjesson | H04L 45/123 370/238 |
| 2014/0373091 A1* | 12/2014 | Kirner | H04L 63/1416 726/1 |

* cited by examiner

CREATING RULES FOR LABELED SERVERS IN A DISTRIBUTED NETWORK MANAGEMENT SYSTEM

CROSS REFERENCES TO RELATED APPLICATIONS

This application claims the benefit of U.S. Provisional Application No. 62/300,831, filed on Feb. 27, 2016, which is incorporated by reference in its entirety.

BACKGROUND

1. Technical Field

The subject matter described herein generally relates to the field of managing servers (physical or virtual) of a network domain and, in particular, to automatically labeling servers and creating communication rules for the labeled servers.

2. Background Information

Servers (physical or virtual) of an administrative domain are managed according to a policy. For example, a security policy might specify access control and/or secure connectivity, while a resource-usage policy might specify usage of the administrative domain's computing resources (e.g., disks and/or peripherals). Conventional policies reference physical devices and are expressed in terms of low-level constructs such as Internet Protocol (IP) addresses, IP address ranges, subnetworks, and network interfaces. These low-level constructs make it difficult to write a fine-grained policy in an abstract and natural way.

Conventional techniques for setting up policies use whitelist models based on rules that exhaustively list permissible actions. Configuring such lists can be very time consuming for administrative domains with large numbers of servers. Furthermore, if the servers are reconfigured or repurposed, the policies applicable to the servers may change and require new lists.

SUMMARY

The above and other issues are addressed by a method, non-transitory computer-readable storage medium, and system for managing security of services executing on servers in a network domain.

An embodiment of a method regulates network traffic of a network domain comprising a plurality of computing devices. Communication information describing characteristics of network traffic having a computing device as an endpoint is obtained. A relation indicating that a consumer computing device is a consumer of a service offered by a provider computing device is identified based on the communication information. A communication rule is generated for regulating communications between the consumer computing device and the provider computing device. The communication rule specifies one or more labels of the provider computing device and one or more labels of the consumer computing device. Management instructions based on the communication rule are generated and sent to computing devices relevant to the communication rule to configure them to implement the communication rule.

An embodiment of a computer readable non-transitory storage medium stores instructions for performing the following steps. The steps comprise obtaining communication information describing characteristics of network traffic having a computing device as an endpoint. The steps further comprise identifying a relation based on the communication information indicating that a consumer computing device is a consumer of a service offered by a provider computing device. The steps further comprise generating a communication rule for regulating communications between the consumer computing device and the provider computing device. The communication rule specifies one or more labels of the provider computing device and one or more labels of the consumer computing device. The steps further comprise generating management instructions based on the communication rule and sending them to computing devices relevant to the communication rule to configure them to implement the communication rule.

An embodiment of a computer system comprises one or more processors and a computer readable non-transitory storage medium storing instructions for execution by the one or more processors. The computer readable non-transitory storage medium stores instructions for performing the following steps. The steps comprise obtaining communication information describing characteristics of network traffic having a computing device as an endpoint. The steps further comprise identifying a relation based on the communication information indicating that a consumer computing device is a consumer of a service offered by a provider computing device. The steps further comprise generating a communication rule for regulating communications between the consumer computing device and the provider computing device. The communication rule specifies one or more labels of the provider computing device and one or more labels of the consumer computing device. The steps further comprise generating management instructions based on the communication rule and sending them to computing devices relevant to the communication rule to configure them to implement the communication rule.

The features and advantages described in this summary and the following detailed description are not all-inclusive. Many additional features and advantages will be apparent to one of ordinary skill in the art in view of the drawings, specification, and claims hereof.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
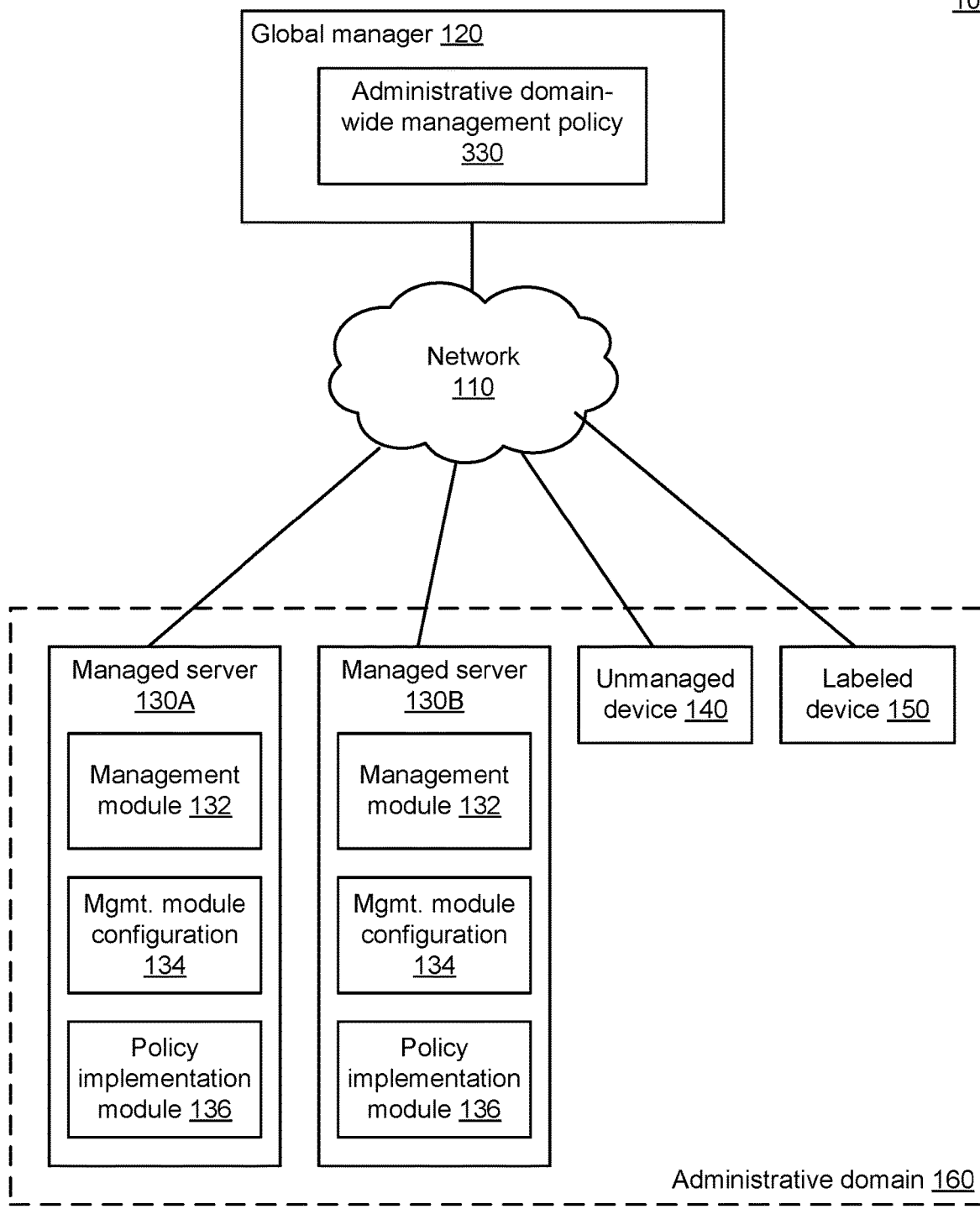
FIG. 1 is a high-level block diagram illustrating an environment for managing servers (physical or virtual) of an administrative domain, according to one embodiment.

FIG. 1 is a high-level block diagram illustrating an environment 100 for managing servers (physical or virtual) of an administrative domain 160, according to one embodiment. The administrative domain 160 can correspond to an enterprise such as, for example, a service provider, a corporation, a university, or a government agency. The administrative domain 160 may alternatively be referred to as a managed domain or network domain. The environment 100 may be maintained by the enterprise itself or by a third party (e.g., a second enterprise) that helps the enterprise manage its servers 130. As shown, the environment 100 includes a network 110, a global manager 120, multiple managed servers 130, an unmanaged device 140, and a labeled device 150. The managed servers 130, the unmanaged device 140, and the labeled device 150 are associated with the administrative domain 160. For example, they are operated by the enterprise or by a third party (e.g., a public cloud service provider) on behalf of the enterprise. While one global manager 120, two managed servers 130, one unmanaged device 140, and one labeled device 150 are shown in the embodiment depicted in FIG. 1 for clarity, other embodiments can have different numbers of global managers 120, managed servers 130, unmanaged devices 140, and/or labeled devices 150. A device is also referred to herein as a computing device.

In some instances, the administrative domain 160 may include one or more network domains. A network domain includes one or more network access points (e.g., managed servers 130, unmanaged devices 140, and labeled devices 150) registered with a domain controller server, which provides directory and identity services. The domain controller server authenticates the identity of a user logging onto a network access point and assigns the network access point permissions corresponding to the identity. For example, the domain controller server verifies identity through a username and password challenge, a physical or virtual security token, some other authentication factor, or a combination thereof. The domain controller server may serve as the global manager 120 or may be a managed server 130 separate from the global manager 120.

The network 110 represents the communication pathway between the global manager 120, the managed servers 130, and the unmanaged devices 140. In one embodiment, the network 110 uses standard communications technologies and/or protocols and can include the Internet. In another embodiment, the entities on the network 110 can use custom and/or dedicated data communications technologies.

Figure 3:
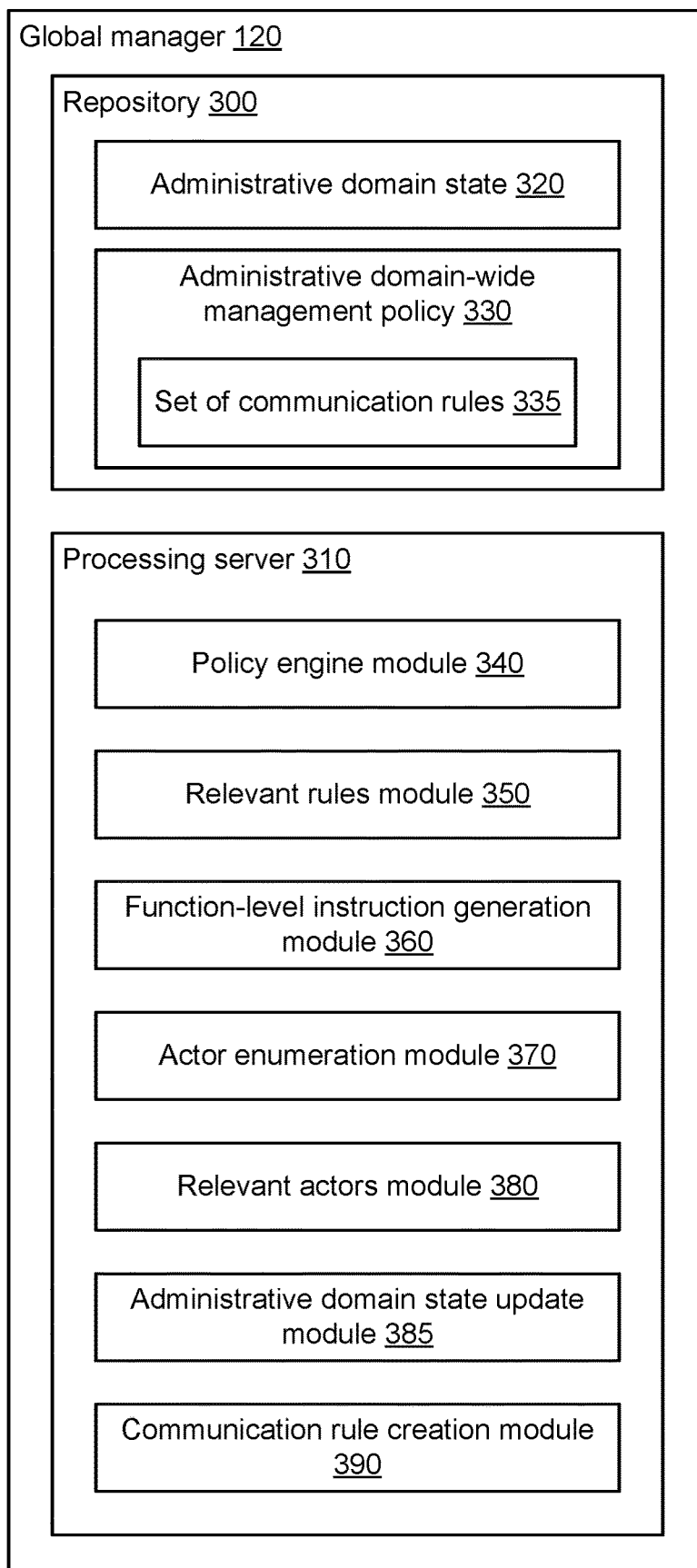
FIG. 3 is a high-level block diagram illustrating a detailed view of a global manager, according to one embodiment.

A managed server 130 is a machine (physical or virtual) that implements an administrative domain-wide management policy 330 (shown in FIG. 3). In one embodiment, a server is a user-space instance of a virtual server (sometimes referred to as a container, virtualization engine, virtual private server, or jail) according to operating system-level virtualization, which is a server virtualization method where the kernel of an operating system enables multiple isolated user-space instances, instead of only one instance. If a managed server 130 is a physical machine, then the managed server 130 is a computer or set of computers. If a managed server 130 is a virtual machine, then the managed server 130 executes on a computer or set of computers. The administrative domain-wide management policy 330 specifies whether and/or how entities associated with the administrative domain 160 are allowed to access (or be accessed by) other entities or otherwise consume (or provide) services. For example, the administrative domain-wide management policy 330 specifies security or resource usage. A security policy might specify access control, secure connectivity, disk encryption, and/or control of executable processes, while a resource-usage policy might specify usage of the administrative domain's computing resources (e.g., disks, peripherals, and/or bandwidth).

A managed server 130 includes a management module 132, a management module configuration 134, and a policy implementation module 136. The management module 132 implements the administrative domain-wide management policy 330. For example, in the case of security, the management module 132 can be a low-level network or security engine such as an operating system-level firewall, an Internet Protocol security (IPsec) engine, or a network traffic filtering engine (e.g., based on the Windows Filtering Platform (WFP) development platform). In the case of resource usage, the management module 132 can be a disk-usage engine or a peripheral-usage engine.

The management module configuration 134 affects the operation of the management module 132. For example, in the case of security, the management module configuration 134 can be access control rules applied by a firewall, secure connectivity policies applied by an IPsec engine (e.g., embodied as iptables entries and ipset entries in the Linux operating system), or filtering rules applied by a filtering engine. In the case of resource usage, the management module configuration 134 can be disk-usage policies applied by a disk-usage engine or peripheral-usage policies applied by a peripheral-usage engine.

The policy implementation module 136 generates the management module configuration 134 based on a) management instructions received from the global manager 120 and b) the state of the managed server 130. The management instructions are generated based, in part, on the administrative domain-wide management policy 330. The management module configuration 134 generated by the policy implementation module 136 implements that administrative domain-wide management policy 330 (to the extent that the policy concerns the managed server 130). This two-step process (generating management instructions and generating the management module configuration 134) is referred to as "instantiating" a management policy. The policy implementation module 136 also monitors the local state of the managed server 130 and sends local state information to the global manager 120.

In one embodiment, the policy implementation module 136 is part of a larger proprietary module (not shown). The proprietary module is loaded onto a device (or virtual device) that already has a management module 132 and a management module configuration 134, thereby transforming the device (or virtual device) from an unmanaged device 140 or labeled device 150 to a managed server 130. The policy implementation module 136 is further described below.

The global manager 120 is a computer (or set of computers) that generates management instructions for managed servers 130 and sends the generated management instructions to the servers. The management instructions are generated based on a) the state of the administrative domain's computer network infrastructure (the "administrative domain state 320") and b) an administrative domain-wide management policy 330. The administrative domain state 320 includes descriptions of managed servers 130 and (optionally) descriptions of unmanaged devices 140 or labeled devices 150. The global manager 120 also processes local state information received from managed servers 130.

The administrative domain-wide management policy 330 is based on a logical management model that can reference managed servers 130 based on their high-level characteristics, referred to herein as "labels." A label is a pair that includes a "dimension" (a high-level characteristic) and a "value" (the value of that high-level characteristic). A management policy constructed in this multi-dimensional space is more expressive than a management policy constructed according to a single-characteristic network/IP address-based policy model. In particular, expressing management policy using the higher-level abstractions of "labels" enables people to better understand, visualize, and modify management policy.

The logical management model (e.g., the number and types of dimensions available and those dimensions' possible values) is configurable. In one embodiment, the logical management model includes the following dimensions and values, as shown in Table 1:

TABLE 1

Example of logical management model

| Dimension | Meaning (M), Values (V) |
| --- | --- |
| Role | M: The role of the managed server within the administrative domain. <br> V: web, API, database |
| Environment | M: The lifecycle stage of the managed server. <br> V: production, staging, development |
| Application | M: The logical application (higher-level grouping of managed servers) to which the managed server belongs. <br> V: trading, human resources |
| Line of Business | M: The business unit to which the managed server belongs. <br> V: marketing, engineering |
| Location | M: The location of the managed server. Can be physical (e.g., country or geographical region) or logical (e.g., network). Physical is particularly useful for expressing geographic compliance requirements. <br> V: US or EU (physical), us-west-1 or us-east-2 (logical) |
| User Group | M: The user group containing the user logged onto the managed server. <br> V: Engineers, Contractors, Managers, System Administrators |

The logical management model enables multiple managed servers 130 to be grouped together by specifying one or more labels (referred to herein as a "label set") that describe all of the managed servers 130 in the group. A label set includes either zero values or one value for a dimension in the logical management model. A label set need not include labels for all dimensions in the logical management model. In this way, the logical management model enables the segmentation and separation of an administrative domain's managed servers 130 and the creation of arbitrary groupings of managed servers 130. The logical management model also allows for a single managed server 130 to exist in multiple overlapping sets (i.e., multiple overlapping groups of managed servers). The logical management model does not limit the single managed server 130 to existing in a hierarchy of nested sets.

In an embodiment, the global manager 120 collects information describing servers 130 of the administrative domain and infers labels describing high-level characteristics of the servers based on the collected information. The collected information may describe communications that a server 130 sends or receives, for example, a rate at which the server communicates, the ports at which communications are sent or received, processes executing on the server and so on. Automatically inferring the labels describing a server 130 allows for describing policies in large networks with a very large number of servers as well as adapting to changes in servers, for example, as a result of adding/removing servers or changing the services provided by different servers. The global manager 120 also identifies servers that are provider of services and servers that are consumers of the services. The global manager 120 generates rules for managing communications associated with the identified services. The generated rules are included in an administrative domain wide policy. The global manager 120 enforces the administrative domain wide policy across the servers of the administrative domain.

In an embodiment, the administrative domain wide policy regulates security of the administrative domain by using segmentation with access control policies to define groups of managed servers 130 that are subject to particular policies. Similarly, segmentation can be used with secure connectivity policies to define groups of managed servers 130 and the policies that apply to intra-group communications and inter-group communications. So, communications among a first group of managed servers 130 (specified by a first label set) can be restricted to a first secure connection setting (e.g., secure connection not required), and communications between the first group of managed servers and a second group of managed servers (specified by a second label set) can be restricted to a second secure connection setting (e.g., IPsec Encapsulating Security Payload (ESP)/Authentication Header (AH) Advanced Encryption Standard (AES)/Secure Hash Algorithm-2 (SHA-2)).

Each managed server 130 in the environment 100 implements the administrative domain-wide management policy 330 (to the extent that the policy concerns the managed server 130). As a result, the administrative domain-wide management policy 330 is applied in a distributed fashion throughout the administrative domain 160, and there are no choke points. Also, the administrative domain-wide management policy 330 is applied at the logical level independent of the administrative domain's physical network topology and network addressing schemes.

An unmanaged device 140 is a computer (or set of computers) that does not include a policy implementation module 136. An unmanaged device 140 does not implement the administrative domain-wide management policy 330. However, interaction between a managed server 130 and an unmanaged device 140 can be subject to the administrative domain-wide management policy 330 (as implemented by the managed server 130). One example of an unmanaged device 140 is a network circuit that is used by an administrative domain 160. Another example of an unmanaged device 140 is a device used by a person to authenticate himself to the administrative domain 160 (e.g., a notebook or desktop computer, a tablet computer, or a mobile phone).

A labeled device 150 is an unmanaged device 140 that the administrative domain-wide management policy 330 refers to by one or more labels ("a label set"). Since label sets refer to high-level characteristics of the labeled device 150, label sets facilitate application of policies controlling communication between a labeled device 150 and a managed server 130. When the global manager 120 labels an unmanaged device 140, the device becomes a labeled device 150. Like unmanaged devices 140 that are unlabeled, labeled devices 150 may be servers, client devices, or other computers, and may be physical computers or virtual computers.

Some managed servers 130 provide bound services that perform different functionality than other services on a managed server 130. A bound service is described by a different label set than the label set of the managed server 130 that provides the bound service. Accordingly, the global manager 120 associates the bound services with label sets that are independent of their host managed server's label set. When applying rules to a managed server 130, the global manager 120 handles a bound service on the managed server 130 as an independent actor from the managed server 130. In some embodiments, the global manager 120 handles each service on a managed server 130 as a separate actor. However, such an embodiment may introduce duplicate actors representing services with matching label sets.

The administrative domain-wide management policy 330 includes rules regulating actors within the administrative domain 160. An actor represents an entity that may be referenced by a rule, for example, any managed server 130, bound service groups, unmanaged devices 140, and/or labeled devices 150. An actor or a set of actors may be identified using labels. An actor may be a device, for example, a managed server 130, an unmanaged device 140, or a labeled device 150. The administrative domain-wide management policy 330 may include rules specifying particular unmanaged devices 140 (identified by their respective network addresses, for instance). However, if an additional unmanaged device 140 joins the administrative domain 160, the rules specifying the particular unmanaged devices 140 do not apply to the additional unmanaged device 140 even if the additional unmanaged device 140 is similar to those unmanaged devices 140 specified by the rule. To cover the additional unmanaged device 140, the global manager 120 modifies the rule to further specify the additional unmanaged device 140. Other rules specify label sets for improved generality and to facilitate intuitive review by an administrator. Such a rule applies to an additional labeled device 150 introduced to the administrative domain 160 without modification of the rule. Accordingly, labeled devices 150 facilitate specification of rules using label sets. Such rules are less computationally complex to maintain, so associating an unmanaged device 140 with a label set (thereby transforming it into a labeled device 150) beneficially facilitates management of the administrative domain 160.

The global manager 120, the administrative domain state 320, and the administrative domain-wide management policy 330 are further described below.

Computer

Figure 2:
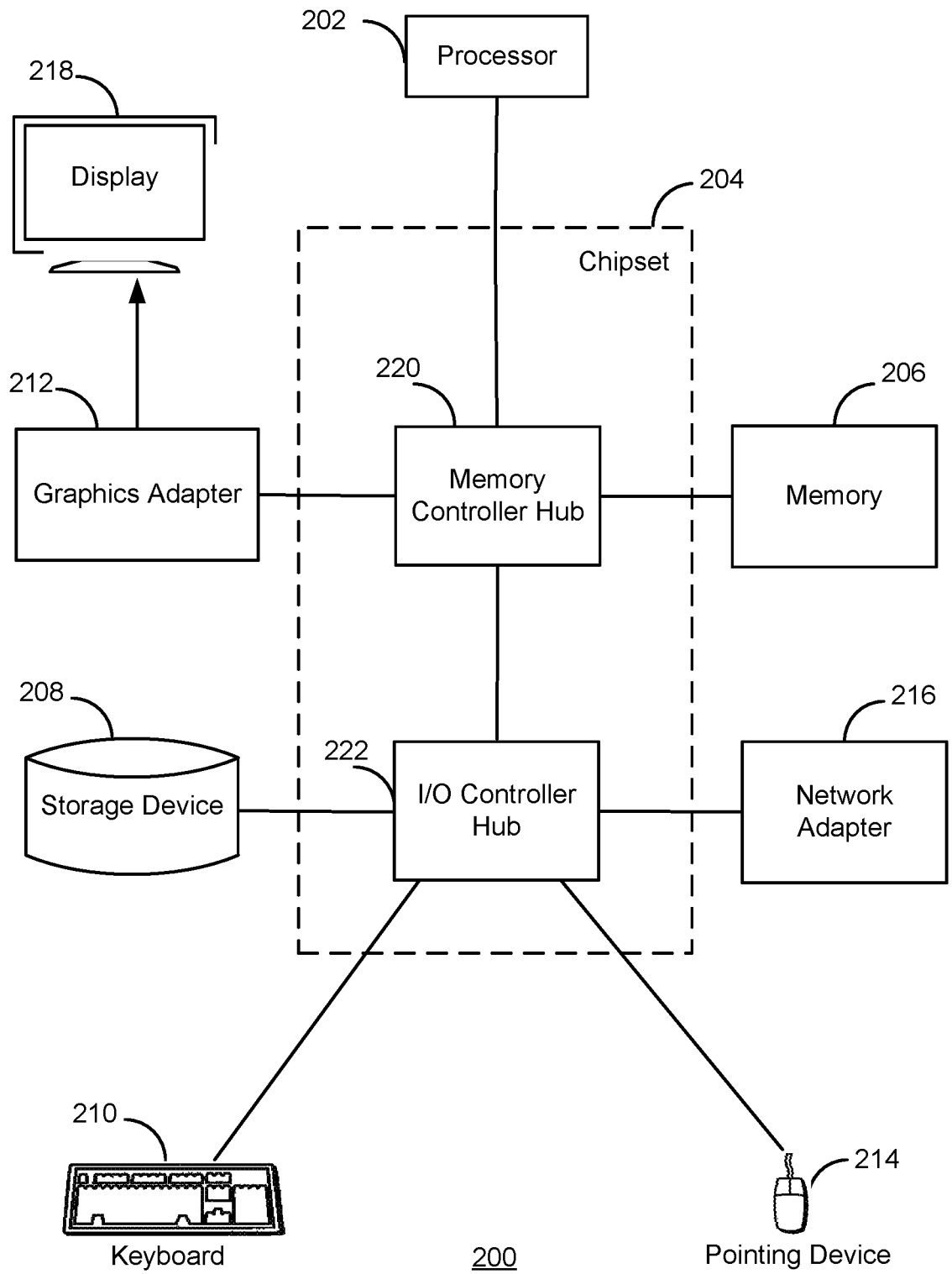
FIG. 2 is a high-level block diagram illustrating an example of a computer for use as one or more of the entities illustrated in FIG. 1, according to one embodiment.

FIG. 2 is a high-level block diagram illustrating an example of a computer 200 for use as one or more of the entities illustrated in FIG. 1, according to one embodiment. Illustrated are at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 includes one or more non-transitory computer-readable storage media such as a hard drive, compact disk read-only memory (CD-ROM), DVD, or a solid-state memory device. The memory 206 holds instructions and data used by the processor 202. The pointing device 214 is used in combination with the keyboard 210 to input data into the computer system 200. The graphics adapter 212 displays images and other information on the display device 218. In some embodiments, the display device 218 includes a touch screen capability for receiving user input and selections. The network adapter 216 couples the computer system 200 to the network 110. Some embodiments of the computer 200 have different and/or other components than those shown in FIG. 2. For example, the global manager 120 and/or the managed server 130 can be formed of multiple blade servers and lack a display device, keyboard, and other components, while an unmanaged device 140 or a labeled device 150 can be a notebook or desktop computer, a tablet computer, or a mobile phone.

The computer 200 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

Global Manager

FIG. 3 is a high-level block diagram illustrating a detailed view of a global manager 120, according to one embodiment. The global manager 120 includes a repository 300 and a processing server 310. The repository 300 is a computer (or set of computers) that stores the administrative domain state 320 and the administrative domain-wide management policy 330. In one embodiment, the repository 300 includes a server that provides the processing server 310 access to the administrative domain state 320 and the management policy 330 in response to requests.

Administrative Domain State

The administrative domain state 320 includes descriptions of managed servers 130 and (optionally) descriptions of other network devices including unmanaged devices 140, and/or labeled devices 150. A description of a managed server 130 includes, for example, a unique identifier (UID), an online/offline indicator, one or more configured characteristics (optional), network exposure information, service information, and one or more labels that describe the managed server 130 (a label set).

The UID uniquely identifies the managed server 130. The online/offline indicator indicates whether the managed server 130 is online or offline. A "configured characteristic" stores a value associated with the managed server 130 and can be any type of information (e.g., an indication of which operating system is running on the managed server). A configured characteristic is used in conjunction with a rule's condition portion (described below).

The network exposure information concerns the managed server's network interfaces. A network interface refers to the hardware, software, of both that a device (e.g., managed server 130) uses to exchange information with the network 110 or other devices in the administrative domain 160. In one embodiment, the network exposure information includes, for each of the managed server's network interfaces, an identifier of a "bidirectionally-reachable network" (BRN) to which the network interface is attached and zero or more IP addresses (and their subnets) that are used for operating within the BRN. A BRN is a set of subnets, within an organization or across organizations, where any node within the BRN can establish communication with any other node in the BRN. For example, all of the nodes in a BRN have unique IP addresses. In other words, a BRN does not contain any NATs. Network exposure information (e.g., a network interface's BRN identifier) can be used in conjunction with a rule's condition portion. In another embodiment, the network exposure information includes routing information and/or whether the managed server is behind a network address translator (NAT) (and, if it is behind a NAT, what type of NAT—1:1 or 1:N).

The description of a managed server 130 also includes service information describing services on a managed server 130 as well as bound services on a managed server 130. The service information includes, for example, process information and/or package information. Process information includes, for example, names of processes that the managed server 130 is running, which network ports and network interfaces those processes are listening on, which users initiated those processes, configurations of those processes, command-line launch arguments of those processes, and dependencies of those processes (e.g., shared objects to which those processes link). (Those processes correspond to the managed server 130 providing a service or using a service.) Package information includes, for example, which packages (executables, libraries, or other components) are installed on the managed server 130, the versions of those packages, the configurations of those packages, and the hash values of those packages. If a managed server 130 provides any bound services, the managed server's description may identify the bound services, bound service groups organizing one or more similar bound services, label sets corresponding to each bound service group, and a pointer to the bound service group, such as a unique identifier (UID).

A description of an unmanaged device 140 includes, for example, network exposure information (e.g., the IP address of the unmanaged device 140 and an identifier of the BRN to which the unmanaged device 140 is connected) or a unique identifier (UID). An unmanaged device 140 is part of an "unmanaged device group" (UDG). A UDG includes one or more unmanaged devices 140. For example, the "Headquarters UDG" could include the primary circuit and the backup circuit that are used by an administrative domain's headquarters, where each circuit is associated with an IP address. A UDG is associated with a unique identifier (UID). Information stored in the administrative domain state 320 regarding a UDG includes the UID of the UDG and information regarding the unmanaged devices 140 in the UDG (e.g., their network exposure information).

Like the description of other unmanaged devices 140, the description of a labeled device 150 may include network exposure information, a UID of the labeled device 150, and/or one or more UDGs including the labeled device 150. Similar to a managed server 130, the description of a labeled device 150 includes a label set describing the high-level characteristics of the labeled device 150. The description of a labeled device 150 may include a flag or other field indicating that the labeled device 150 lacks a policy implementation module 136 (or equivalently whether the labeled device 150 is a managed server 130). The description of a labeled device 150 may also include configured characteristics indicating additional labeled device information that is externally visible to the global manager 120 or a managed server 130. For example, even though a labeled device 150 lacks a policy implementation module 136, a managed server 130 might determine the operating system of the labeled device 150 based on the labeled device's response to valid and invalid requests (e.g., valid and invalid transmission control protocol (TCP) packets). As another example, a managed server 130 determines whether a labeled device 150 is online or offline by determining if the labeled device 150 responds to requests (e.g., ping requests).

Descriptions of managed servers 130, unmanaged devices 140, and labeled devices 150 can be loaded into the administrative domain state 320 in various ways, such as by interacting with the global manager 120 via a graphical user interface (GUI) or an application programming interface (API). Descriptions of managed servers 130 can also be loaded into the administrative domain state 320 based on local status information received from managed servers.

Regarding labels, the global manager 120 may assign (or reassign) a value to a label dimension in many ways. For example, the assignment/setting can be performed using a deployment and configuration tool as part of provisioning a managed server 130. Any such tool can be used, including off-the-shelf third-party tools (e.g., Puppet Labs' Puppet software, Opscode's Chef software, or CFEngine AS' CFEngine software) and custom tools that an administrative domain 160 might have.

Administrative Domain-wide Management Policy

The administrative domain-wide management policy 330 includes one or more rules. Broadly speaking, a "rule" specifies a relationship between one or more providers of a service and one or more consumers of that service. The administrative domain-wide management policy 330 includes a set of access control rules 335.

The relationship of a rule is subjected to a "rule function", which is the practical effect of the rule. For example, in the case of security, the rule function could be access control, secure connectivity, disk encryption, or control of executable processes. A rule with an access control function specifies whether a consumer may use a provider's service. In one embodiment, the access control function uses a pure "whitelist" model, which means that only the allowable relationships are expressed, and all other relationships are blocked by default. A rule with a secure connectivity function specifies over what secure channels (e.g., encrypted network sessions using point-to-point data encryption) a consumer may use a provider's service. For example, a rule with a secure connectivity function could specify that usage of a provider's services must be encrypted when the provider is located in the US and the consumer is located in the EU. A rule with a disk encryption function specifies whether a provider must store its data on an encrypted file system. A rule with an executable process-control function specifies whether a process is allowed to execute.

In the case of resource usage, the rule function could be disk-usage or peripheral-usage. A rule with a disk-usage function specifies an amount of data that a consumer can store on a provider. Note that a rule can specify other rule functions as well beyond just access control, secure connectivity, disk encryption, control of executable processes, disk usage, and peripheral usage. For example, a rule function could specify which Open Systems Interconnection (OSI) model Layer-7 services to apply to network traffic, the amount of metadata to collect for security analytics, or the triggers for capturing a complete network packet. The management policy model supports any number of rule functions that can be applied.

A rule function can be associated with one or more settings (referred to herein as a "function profile") that specify details regarding the practical effect of the rule. For example, a function profile associated with a secure connectivity rule function can include a list of cryptographic algorithms used to encrypt network traffic. In one embodiment, a rule function is associated with multiple function profiles, and a function profile includes a priority. This priority is used by the function-level instruction generation module 360, as described below.

A "service" is a process executing on a specific network port using a specific network protocol. A rule within the management policy specifies a service using a port/protocol pair and (optionally) additional qualifications, such as process information and/or package information (described above with respect to a description of a managed server 130 within the administrative domain state 320). If a managed server 130 has multiple network interfaces, then a service can be exposed on all networks or on only a subset of those networks. The end-user specifies on which networks the service is exposed. Note that, depending on the rule function, a service might not use any network resources. For example, a service for an executable process-control rule function does not execute on a network port using a network protocol.

The one or more providers of the service and the one or more consumers (i.e., users) of the service are managed servers 130, bound services, unmanaged devices 140, and/or labeled devices.

In one embodiment, a rule is represented within the administrative domain-wide management policy 330 using a set of information that includes a rule function portion, a service portion, a provided-by portion, a used-by portion, and an optional rule condition portion. The rule function portion describes the practical effect of the rule and can be associated with one or more settings (function profiles). The service portion describes the service to which the rule applies. If the service portion indicates "All", then the rule applies to all services.

The provided-by (PB) portion describes which managed servers 130, bound service groups, unmanaged devices 140, and/or labeled devices 150 can provide the service (i.e., who the "providers" are). If the PB portion indicates "Anybody", then any actor (e.g., any managed server 130, bound service groups, unmanaged devices 140, and/or labeled devices 150) can provide the service. If the PB portion indicates "Any labeled device", then any managed server 130, bound service group, or labeled device 150 can provide the service. ("Any labeled device" is equivalent to specifying a label set that contains a wildcard, thereby matching all managed servers 130, bound service groups, and labeled devices 150.) Similarly, if the PB portion indicates "Any managed server", then any managed server 130 can provide the service regardless of the managed server's label. The used-by (UB) portion describes which managed servers 130, bound service groups, unmanaged devices 140, and/or labeled devices 150 can use the service (i.e., who the "consumers" are). Similar to the PB portion, the UB portion can also indicate "Anybody", "Any labeled device", or "Any managed server."

Within the PB portion and the UB portion, a managed server 130 or labeled device 150 is specified by a label set (e.g., one or more labels that describe the managed server) or a UID. The ability to specify managed servers 130, bound service groups, and/or or labeled devices 150 using label sets stems from the logical management model, which references managed servers based on their dimensions and values (labels). An unmanaged device 140 that is unlabeled is specified by using a UID of an unmanaged device group (UDG). If a rule specifies a UDG, then the rule includes additional information regarding the unmanaged devices 140 in that group (e.g., the devices' network exposure information). The PB portion of a rule and/or the UB portion of a rule can include multiple items, including label sets (to specify managed servers 130, bound service groups, and/or labeled devices 150), managed server UIDs, and/or UDG UIDs.

Rules within the administrative domain-wide management policy 330 are organized into rule lists. Specifically, the management policy 330 includes one or more rule lists, and a rule list includes one or more rules and (optionally) one or more scopes. A "scope" constrains where (i.e., specifies, to which managed servers 130, bound service group, or labeled devices 150) a rule is applied. A scope includes a provided-by (PB) portion and a used-by (UB) portion that limit the application of the rules in the rule list. The PB portion of the scope limits the PB portion of the rules, and the UB portion of the scope limits the UB portion of the rules. The PB and UB portions of a scope can specify a group of managed servers 130 (or a bound service group, or a group of labeled devices 150) by using a label set. If the label set does not contain a label for a specific dimension, then there is no scoping of that dimension for the resulting group of managed servers 130. If a rule list does not include any scopes, then its rules are applied globally.

Different scopes can be applied to a single rule list. For example, an administrator can build a set of rules that express how the web service tier (managed servers 130 and bound service groups with a <Role, Web> label) consumes services from the database tier (managed servers with a <Role, Database> label), how the load-balancing tier consumes services from the web service tier, and so on. Then, if the administrator wants to apply this rule list to the production environment (managed servers 130 with an <Environment, Production> label) and to the staging environment (managed servers 130 with an <Environment, Staging> label), the administrator does not need to copy or duplicate the rule list. Instead, the administrator applies multiple scopes to a single rule list (a first scope where the PB portion and the UB portion include the <Environment, Production> label and a second scope where the PB portion and the UB portion include the <Environment, Staging> label). The scope abstraction makes the rule list scale from both a usability perspective and a computational perspective.

Following are examples of rules. Consider the following administrative domain-wide management policy 330, which is a security policy that specifies access control and secure connectivity:

Rule List #1
  Scopes
    <Environment, Production>
    <Environment, Staging>
  Rules
    #1
      Function: Access Control
      Service: Apache
      PB: <Role, Web>
      UB: Anybody

2
    Function: Access Control
    Service: PostgreSQL
    PB: <Role, Database>
    UB: <Role, Web>

Note that the rules above refer to services simply as "Apache" and "PostgreSQL" for clarity. Remember that a service is a set of one or more processes and is specified by a set of one or more port/protocol pairs and (optionally) additional qualifications, such as process information and/or package information (described above with respect to a description of a managed server 130 within the administrative domain state 320). For example, a domain name system (DNS) service includes the port/protocol pairs UDP/53 and TCP/53, where 53 is the port number, UDP is the user datagram protocol, and TCP is the transmission control protocol.

Rule List #1/Rule #1 allows any device (e.g., a user device) to connect to a web server and use the Apache service. Specifically, the allowance of a connection is specified by "Access Control" in the Function portion. The "any device" is specified by "Anybody" in the UB portion. The "web server" is specified by "<Role, Web>" (a label set that includes only one label) in the PB portion. The Apache service is specified by "Apache" in the Service portion.

Rule List #1/Rule #2 allows a web server to connect to the PostgreSQL service on a database server. Specifically, the allowance of a connection is specified by "Access Control" in the Function portion. The "web server" is specified by "<Role, Web>" in the UB portion. The "PostgreSQL" is specified by "PostgreSQL" in the Service portion. The "database server" is specified by "<Role, Database>" (a label set that includes only one label) in the PB portion.

Following are two example managed servers 130: Server 1 is a web server that is part of production, part of app1, and owned by engineering in California. Server 1 is labeled as:

```
<Role, Web>
<Environment, Production>
<Application, app1>
<LB, Engineering>
<Location, US>
```

Server 2 is a database server that is part of production, also part of app1, and also owned by engineering but in Germany. Server 2 is labeled as:

```
<Role, Database Server>
<Environment, Production>
<Application, app1>
<LB, Engineering>
<Location, EU>
```

Assume that an access control rule allows all access to all managed servers 130 that are part of app1. This rule would allow Server 1 and Server 2 to communicate with each other and would disallow a managed server 130 in Germany that is part of app2 from communicating with Server 1 or Server 2. Now assume that a secure connectivity rule specifies that all network traffic between EU and US must be encrypted. Rule functions are independently applied. In other words, the secure connectivity rule is a separate policy that is applied independent of the access control rule. As a result, the network traffic from Server 1 to Server 2 would be allowed (given the access control rule) and encrypted (given the secure connectivity rule).

Processing Server

The processing server 310 generates management instructions for managed servers 130 and bound services executing on those servers and sends the generated management instructions to the servers. The processing server 310 also processes local state information received from managed servers 130. The processing server 310 includes various modules such as a policy engine module 340, a relevant rules module 350, a function-level instruction generation module 360, an actor enumeration module 370, a relevant actors module 380, an administrative domain state update module 385, and a communication rule creation module 390. In one embodiment, the processing server 310 includes a computer (or set of computers) that communicates with the repository 300 and processes data (e.g., by executing the various modules within it).

The relevant rules module 350 takes as input the administrative domain-wide management policy 330 and an indication of a particular managed server 130 (e.g., that server's UID), generates a set of rules that are relevant to that server, and outputs the set of rules. This is a filtering process by which the relevant rules module 350 examines the management policy 330 and extracts only the relevant rules for the given managed server 130.

A rule applies to a managed server 130 if (a) the PB portion of the rule and/or the UB portion of the rule specifies the managed server 130 or one of its bound services and (b) the condition portion of the rule (if present) evaluates to "true" for that managed server (specifically, for the values of that managed server's configured characteristics and network exposure information). The end result (referred to herein as a "management policy perspective") is a collection of two sets of rules: rules where this managed server 130 provides a service and rules where this managed server 130 consumes a service.

The function-level instruction generation module 360 takes as input a set of rules (e.g., a management policy perspective generated by the relevant rules module 350), generates function-level instructions, and outputs the function-level instructions. The function-level instructions are later sent to a managed server 130 as part of the management instructions. A function-level instruction is similar to a rule in that each one includes a rule function portion, a service portion, a PB portion, and a UB portion. However, whereas a rule can include multiple items within its PB portion and/or UB portion (including label sets, addresses of network interfaces, managed server UIDs, and/or UDG UIDs), a function-level instruction includes only one item within its PB portion and only one item within its UB portion. Also, whereas a rule can specify a managed server 130, bound service group, or labeled device 150 (including the labeled actor's one or more network interfaces) within its PB portion and/or UB portion, a function-level instruction refers to only one network interface within its PB portion and one network interface within its UB portion. Alternatively or additionally, a function-level instruction refers to an actor-set within its PB portion or UB portion. Alternatively or additionally, the PB or UB portion refers to a particular port associated with a bound service.

The function-level instruction generation module 360 analyzes a rule and generates one or more function-level instructions based on that rule. If the rule's PB portion includes multiple items, the rule's UB portion incudes multiple items, or a managed server 130 referenced by the rule (in the PB portion or UB portion) has multiple network ports, then the function-level instruction generation module 360 generates multiple function-level instructions (e.g., one function-level instruction for each possible combination of a PB item, a UB item, and a particular network port).

The actor enumeration module 370 takes as input a collection of descriptions of managed servers 130, bound service groups, labeled devices 150, and unmanaged device groups (UDGs) (e.g., the administrative domain state 320), generates representations of those descriptions of servers, devices, bound services, and UDGs in an enumerated form (referred to as "actor-sets"), and outputs the actor-sets. For example, the actor enumeration module 370 enumerates the managed servers 130, labeled devices 150, and the UDGs within the administrative domain state 320 and the possible label sets and assigns each a unique identifier (UID). These actor-sets can then be used in conjunction with UB portions and PB portions of rules and scopes, which specify actors using managed server UIDs, bound service group UIDs, UDG UIDs, and/or label sets. In an embodiment, the actor enumeration module 370 enumerates only those label sets that are used in the administrative domain-wide management policy 330 (e.g., in UB portions and PB portions of rules and scopes).

An actor-set includes a UID and zero or more actor-set records. An actor-set record includes a UID (either a managed server UID, labeled device UID, a UDG UID, a bound service group UID), an identifier of the actor's operating system, and the actor's IP address given the specific BRN. For example, an actor-set might include actor-set records whose IP addresses correspond to all of the managed servers 130 covered by the label set of <Role, Database> and <Environment, Production>. As another example, an actor-set might include actor-set records whose IP addresses correspond to all of the unmanaged devices 140 in the Headquarters UDG. A single actor (e.g., managed server 130, unmanaged device 140, labeled device 150, bound service group) can appear in multiple actor-sets.

In one embodiment, the actor enumeration module 370 can also update actor-sets based on changes to the administrative domain state 320. For example, the actor enumeration module 370 takes as input actor-sets (previously output by the actor enumeration module 370) and a change to a managed server's description (within the administrative domain state 320), generates updated actor-sets (which are consistent with the changed server description), and outputs the updated actor-sets. Similarly, a detected change of state in an unmanaged device 140 or labeled device 150 triggers generation of updated actor-sets.

The relevant actors module 380 takes as input one or more actor-sets (e.g., the managed servers 130, labeled devices 150, the UDGs, and bound service groups) within the administrative domain state 320 in enumerated form, and a set of rules (e.g., a management policy perspective), determines which actor-sets are relevant to those rules, and outputs only those actor-sets. This is a filtering process by which the relevant actors module 380 examines the actor-sets and extracts only the relevant actor-sets for the given set of rules. The relevant actors module 380 performs the filtering by iterating through all of the input actor-sets, analyzing the PB portions and UB portions of the input rules to determine whether a particular actor-set is referenced by any of the rules' PB portions or UB portions. The end result (referred to herein as an "actor perspective") is a collection of actor-sets. The actor perspective is later sent to a managed server 130 as part of the management instructions.

The policy engine module 340 generates management instructions for managed servers 130 and sends the generated management instructions to the servers. The policy engine module 340 generates the management instructions (using the relevant rules module 350, the function-level instruction generation module 360, the actor enumeration module 370, and the relevant actors module 380) based on a) the administrative domain state 320 and b) the administrative domain-wide management policy 330.

For example, the policy engine module 340 executes the relevant rules module 350, providing as input the administrative domain-wide management policy 330 and the UID of a particular managed server 130. The relevant rules module 350 outputs a set of rules that are relevant to that server (a "management policy perspective"). The policy engine module 340 executes the actor enumeration module 370, providing as input the administrative domain state 320. The actor enumeration module 370 outputs a representation of the descriptions of the managed servers 130, labeled devices 150, unmanaged device groups (UDGs), and bound service groups within the administrative domain state 320 in an enumerated form ("actor-sets"). The policy engine module 340 executes the function-level instruction generation module 360, providing as input the management policy perspective (output by the relevant rules module 350). The function-level instruction generation module 360 outputs function-level instructions. The policy engine module 340 executes the relevant actors module 380, providing as input the actor-sets (output by the enumeration module 370) and the management policy perspective (output by the relevant rules module 350). The relevant actors module 380 outputs only those actor-sets that are relevant to those rules ("relevant actor-sets"). The policy engine module 340 sends the function-level instructions (output by the function-level instruction generation module 360) and the relevant actor-sets (output by the relevant actors module 380) to the particular managed server 130.

In an embodiment, only selected actor-sets are sent to selected servers. For example, a particular managed server 130 is sent only those actor-sets that a) were previously sent to that server and b) have changed. The cached relevant actor-sets indicate which actor-sets were previously sent to that server (see (a) above). The policy engine module 340 compares the cached actor-sets to the updated actor-sets to determine which actor-sets have changed (see (b) above). The policy engine module 340 then computes the intersection of (a) and (b). Actor-sets in that intersection are sent to the particular managed server.

The policy engine module 340 also executes the actor enumeration module 370, providing as input the cached actor-sets and the changed portion of the administrative domain state 320 (e.g., the changed server description). The actor enumeration module 370 outputs the updated actor-sets. The policy engine module 340 executes the relevant actors module 380, providing as input the updated actor-sets and the just-output management policy perspective. The relevant actors module 380 outputs only those updated actor-sets that are relevant to those rules ("updated relevant actor-sets").

The policy engine module 340 can update a managed server's management instructions (based on a change to the administrative domain-wide management policy 330) and send the updated management instructions to the managed server 130. A change to the management policy 330 is, for example, the addition, removal, or modification of a rule or a rule set. In one embodiment, a change to the management policy 330 is generated by interaction with the global manager 120 via a GUI or API. In another embodiment, a change to the management policy 330 is generated by an automated process within the global manager 120 (e.g., in response to a security threat detected by the global manager). The policy engine module 340 updates the managed server's management instructions and sends the updated management instructions to the managed server 130 in a similar way, regardless of whether there was a change to the management policy 330 or a change to the administrative domain state 320. However, there are a few differences.

The administrative domain state update (ADSU) module 385 receives changes to the administrative domain state 320 and processes those changes. A change to the administrative domain state 320 is, for example, the addition, removal, or modification of a description of a managed server 130, bound service group, or labeled device 150 (including the modification of label set or configured characteristics) or a description of an unmanaged device 140 or unmanaged device group. In one embodiment, a change to the administrative domain state 320 originates in local state information received from a particular managed server 130. In another embodiment, a change to the administrative domain state 320 is generated by interaction with the global manager 120 via a GUI or API. In yet another embodiment, a change to the administrative domain state 320 is generated by an automated process within the global manager 120 (e.g., in response to a security threat detected by the global manager).

As an example, the ADSU module 385 receives a change regarding a particular managed server 130. The ADSU module 385 stores the new information in the administrative domain state 320 as part of the description of that particular managed server 130. The ADSU module 385 then (optionally) analyzes that managed server's description to determine additional information regarding the server and stores that information in the description. The ADSU module 385 then determines whether to update the administrative domain's actor-sets and/or the managed server's management instructions based on a change to the managed server's description. If the ADSU module 385 determines to update the administrative domain's actor-sets, then the ADSU module 385 instructs the policy engine module 340 to update the administrative domain's actor-sets. In one embodiment, the ADSU module 385 waits for an event to occur before instructing the policy engine module 340 to update the administrative domain's actor-sets. If the ADSU module 385 determines to update the managed server's management instructions, then the ADSU module 385 instructs the policy engine module 340 to update the managed server's management instructions. In one embodiment, the ADSU module 385 waits for an event to occur before instructing the policy engine module 340 to update the managed server's management instructions. The aforementioned events can be, for example, receipt of a user command or occurrence of a specified maintenance window.

The communication rule creation module 390 is described below in the section entitled "Communication Rules."

Policy Implementation Module

Figure 4:
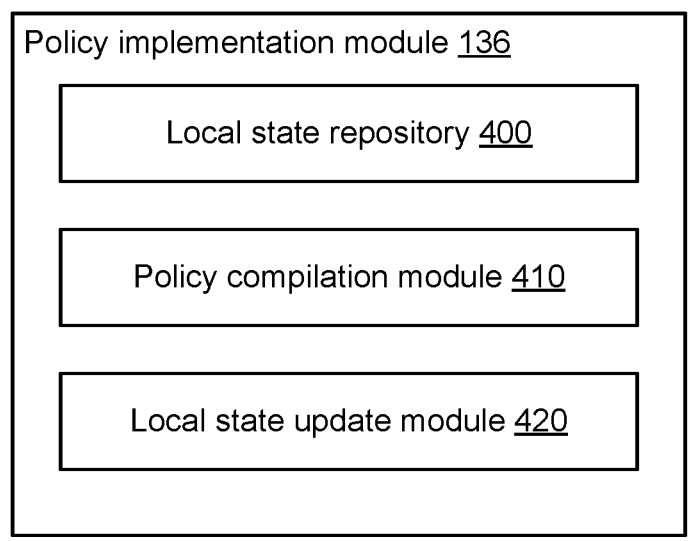
FIG. 4 is a high-level block diagram illustrating a detailed view of a policy implementation module of a managed server, according to one embodiment.

FIG. 4 is a high-level block diagram illustrating a detailed view of a policy implementation module 136 of a managed server 130, according to one embodiment. The policy implementation module 136 includes a local state repository 400, a policy compilation module 410, and a local state update module 420. The local state repository 400 stores information regarding the local state of the managed server 130. In one embodiment, the local state repository 400 stores information regarding the managed server's operating system (OS), network exposure, and services. OS information includes, for example, an indication of which OS is running. Network exposure information and service information were described above with respect to a description of a managed server 130 within the administrative domain state 320.

The policy compilation module 410 takes as input management instructions and the state of the managed server 130 and generates a management module configuration 134. For example, the management instructions are received from the global manager 120 and include function-level instructions (generated by the function-level instruction generation module 360) and relevant actor-sets (output by the relevant actors module 380). The state of the managed server 130 is retrieved from the local state repository 400. In one embodiment, execution of the policy compilation module 410 is triggered by a) the managed server powering up or coming online, b) the managed server receiving management instructions, and/or c) the contents of the local state repository 400 changing.

The policy compilation module 410 maps the function-level instructions and relevant actor-sets into a management module configuration 134. For example, the policy compilation module 410 maps an access control function-level instruction (which contains a port and an actor-set reference) into an iptables entry and an ipset entry in the Linux operating system or a Windows Filtering Platform (WFP) rule in the Windows operating system.

The application of management policy at a managed server 130 can be affected by the local state of that server. In one embodiment, the policy compilation module 410 evaluates a condition associated with a received function-level instruction and generates the management module configuration 134 based on the result of that evaluation. For example, the policy compilation module 410 evaluates a condition that references the operating system of the managed server's peer (i.e., the other actor in the relationship) and selects function profile attributes based on the result of that evaluation, where the selected function profile attributes are expressed in the management module configuration 134.

In one embodiment, a managed server 130 monitors its outbound connections. The managed server 130 compares outbound network traffic to its internal process table to determine which processes in that table are establishing those outbound connections. The managed server 130 can enforce a rule that allows only certain processes (given a set of requirements, mentioned above as "process information") to establish an outbound connection.

In one embodiment (not shown), the policy compilation module 410 is located at the global manager 120 instead of at the managed server 130. In that embodiment, the global manager 120 does not send management instructions to the managed server 130. Instead, the managed server 130 sends its local state to the global manager 120. After the policy compilation module 410 generates the management module configuration 134 (at the global manager 120), the management module configuration 134 is sent from the global manager 120 to the managed server 130.

The local state update (LSU) module 420 monitors the local state of the managed server 130 and sends local state information to the global manager 120. In one embodiment, the LSU module 420 determines an initial local state of the managed server 130, stores appropriate local state information in the local state repository 400, and sends that local state information to the global manager 120. The LSU module 420 determines the local state of the managed server 130 by inspecting various parts of the server's operating system (OS) and/or file system. For example, the LSU module 420 obtains service information from the OS kernel tables (networking information), the OS system tables (package information), and the file system (files and hash values). The LSU module 420 obtains network exposure information from the OS kernel and and/or OS-level data structures.

After the LSU module 420 sends the initial local state information to the global manager 120, the LSU module monitors changes to the local state. The LSU module monitors changes by, for example, polling (e.g., performing inspections periodically) or listening (e.g., subscribing to an event stream). The LSU module 420 compares recently-obtained local state information to information already stored in the local state repository 400. If the information matches, then the LSU module 420 takes no further action (until local state information is obtained again). If they differ, then the LSU module 420 stores the recently-obtained information in the local state repository 400, executes the policy compilation module 410 to re-generate the management module configuration 134 (and re-configures the management module 132 accordingly), and notifies the global manager 120 of the change.

Generating Management Instructions

Figure 5:
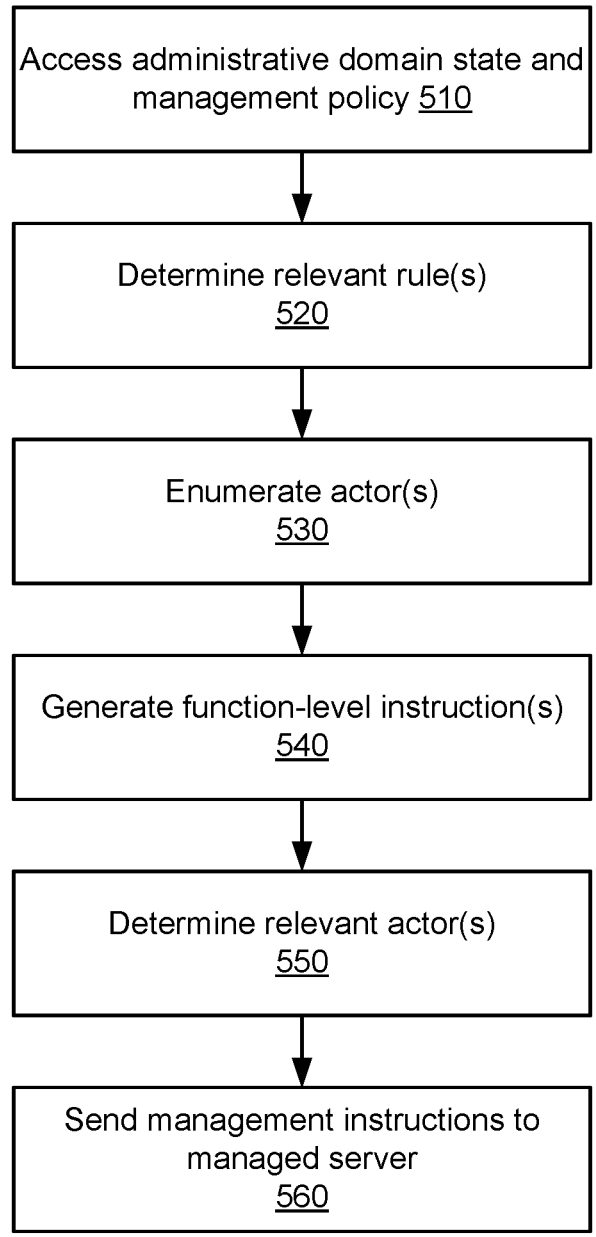
FIG. 5 is a flowchart illustrating a method of generating management instructions for a particular managed server, according to one embodiment.

FIG. 5 is a flowchart illustrating a method 500 of generating management instructions for a particular service group on a particular managed server 130, according to one embodiment. Recall that a service group refers to (a) a bound service group or (b) those services on the managed server 130 that are not bound services. Other embodiments can perform the steps in different orders and can include different and/or additional steps. In addition, some or all of the steps can be performed by entities other than those shown in FIG. 1. In one embodiment, the method 500 is executed multiple times (e.g., once for each managed server 130 in an administrative domain 160).

The administrative domain state 320 and an administrative domain-wide management policy 330 are stored in the repository 300 of the global manager 120. In step 510, the administrative domain state 320 and the administrative domain-wide management policy 330 are accessed. For example, the policy engine module 340 sends a request to the repository 300 and receives the administrative domain state 320 and the administrative domain-wide management policy 330 in response.

In step 520, one or more relevant rules are determined. For example, the policy engine module 340 executes the relevant rules module 350, providing as input the administrative domain-wide management policy 330, the UID of the particular managed server 130, and a UID of a service group. The relevant rules module 350 outputs a set of rules that are relevant to both the managed server 130 and the service group (management policy perspective).

In step 530, actors are enumerated. For example, the policy engine module 340 executes the actor enumeration module 370, providing as input the administrative domain state 320. The actor enumeration module 370 generates a representation of the managed servers 130, labeled devices 150, unmanaged device groups (UDGs), and bound service groups within the administrative domain state 320 in an enumerated form (actor-sets).

In step 540, one or more function-level instructions are generated. For example, the policy engine module 340 executes the function-level instruction generation module 360, providing as input the management policy perspective (generated in step 520). The function-level instruction generation module 360 generates function-level instructions relevant to the input service group.

In step 550, one or more relevant actors are determined. For example, the policy engine module 340 executes the relevant actors module 380, providing as input the actor-sets (generated in step 530) and the management policy perspective (generated in step 520). The relevant actors module 380 outputs only those actor-sets that are relevant to those rules (relevant actor-sets).

In step 560, management instructions are sent to the particular managed server 130. For example, the policy engine module 340 sends the function-level instructions (generated in step 540) and the relevant actor-sets (generated in step 550) to the particular managed server 130.

Note that steps 520 and 540 concern generating the management policy perspective (and resulting function-level instructions) for a particular service group on a particular managed server 130, while steps 530 and 550 concern generating the actor perspective for that service group and the managed server providing the service group. The generation of the management policy perspective and the generation of the actor perspective are minimally dependent on each other, since step 520 generates a set of rules that is used by step 550. Since the management policy calculations and the actor-set calculations are kept mostly separate, they can be performed in parallel (e.g., even for the same managed server 130 or bound service group). In addition, perspective calculations for different managed servers 130 and service groups can also be performed in parallel. Also, if an actor changes, then only the actor-sets need to be recalculated. (The function-level instructions do not need to be recalculated.) If a rule changes, then only the function-level instructions and the relevant actor-sets need to be recalculated. (The actors do not need to be re-enumerated.)

Configuring the Management Module

Figure 6:
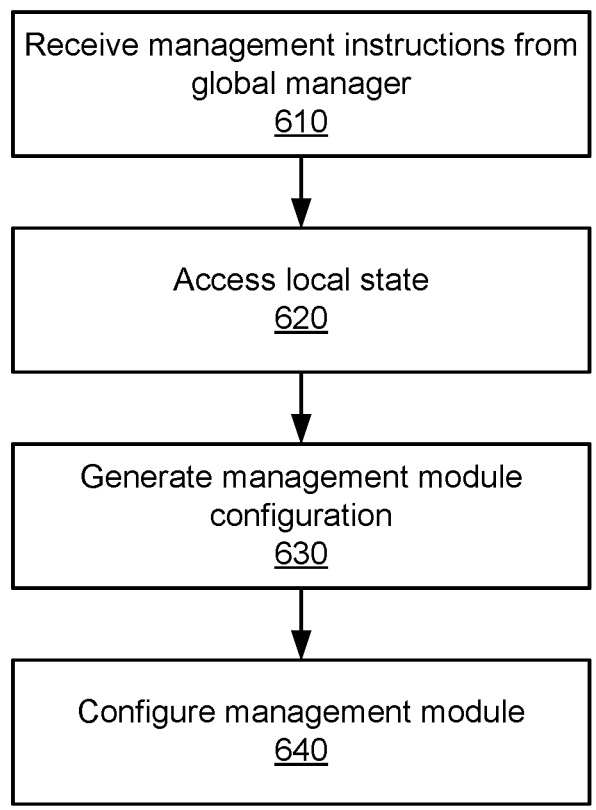
FIG. 6 is a flowchart illustrating a method of generating a configuration for a management module of a managed server, according to one embodiment.

FIG. 6 is a flowchart illustrating a method 600 of generating a configuration 134 for a management module 132 of a managed server 130, according to one embodiment. Other embodiments can perform the steps in different orders and can include different and/or additional steps. In addition, some or all of the steps can be performed by entities other than those shown in FIG. 1.

When the method 600 starts, information regarding the local state of the managed server 130 has already been stored in the local state repository 400 of the policy implementation module 136 in the managed server 130. At this point, the method 600 begins.

In step 610, management instructions are received from the global manager 120. For example, the policy compilation module 410 receives function-level instructions and relevant actor-sets from the global manager 120.

In step 620, the local state is accessed. For example, the policy compilation module 410 accesses information regarding the local state of the managed server 130 that is stored in the local state repository 400.

In step 630, a management module configuration 134 is generated. For example, the policy compilation module 410 takes as input the management instructions (received in step 610) and the local state (accessed in step 620) and generates a management module configuration 134.

In step 640, a management module 132 is configured. For example, the policy compilation module 410 configures the management module 132 to operate in accordance with the management module configuration 134 (generated in step 630).

Communication Rules

Recall that the administrative domain-wide management policy 330 of the global manager 120 includes a set of communication rules 335. The set of communication rules 335 contains one or more communication rules, which are rules that control communication between two actors of the administrative domain. Example rules in the set of communication rules 335 include rules having a rule function specifying permissible communications (referred to herein as "access control rules"), rules having a rule function mandating encryption of communication (referred to herein as "encryption rules"), and rules having a rule function regulating bandwidth-usage (referred to herein as "bandwidth rules"). Other example communication rules are possible, such as a rule specifying a Layer-7 service to apply to a communication.

Broadly, a communication rule authorizes communication between a first actor (e.g., a managed server 130, a bound service) and a second actor (e.g., another managed server 130, another bound service, an unmanaged device 140, a labeled device 150, or a device external to the administrative domain 180). A communication rule specifies a provided-by (PB) portion, a used-by (UB) portion, and a service. For example, an access control rule specifies whether a consumer specified by the UB portion may use a service from a provider specified by the PB portion. In one embodiment, the access control rules are used in a "whitelist" model in which a consumer may access a service on a provider only if the set of access control rules 335 includes an access control rule with matching PB, UB, and service portions. As another example, an encryption rule mandates a particular type of encryption for communication between a consumer and provider of a service specified by the rule.

A communication rule (or an access control rule) may only partially specify the PB, UB, and service portions by using a wildcard in place of one or more portions. For example, if an access control rule has a UB portion that specifies a wildcard, then any managed server 130, unmanaged device 140, labeled device 150, or other device external to the administrative domain 160 may access the service. The PB and UB portions may specify one or more particular actors (e.g., using managed server UIDs, bound service group UIDs, or UDG UIDs), one or more label sets, or a combination thereof. An example access control rule has a PB portion indicating a particular managed server 130 and a UB portion indicating the label set <Role, Database Server> and <Environment, Production>. The example access control rule allows managed servers 130 having a "Database Server" role and belonging to the "Production" environment to access the service at the particular managed server 130.

Communication Rule Creation Module

Figure 7:
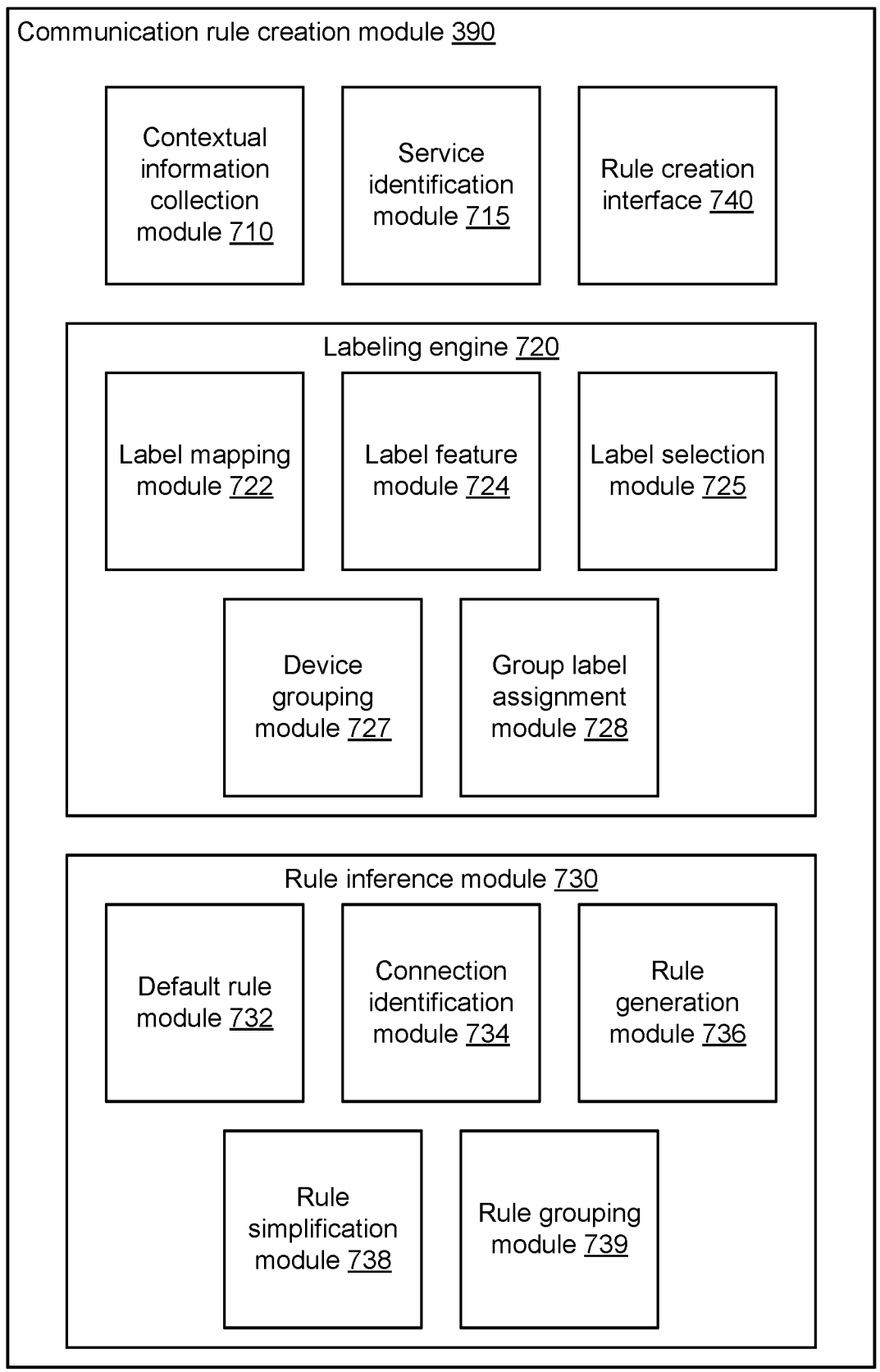
FIG. 7 is a high-level block diagram illustrating a detailed view of a communication rule creation module of a global manager, according to one embodiment.

The processing server 310 of the global manager 120 includes a communication rule creation module 390. FIG. 7 is a high-level block diagram illustrating a detailed view of the communication rule creation module 390 of the global manager 120, according to one embodiment. The communication rule creation module 390 includes a contextual information collection module 710, a service identification module 715, a labeling engine 720, a rule inference module 730, and a rule creation interface 740.

As an overview, the communication rule creation module 390 assigns labels to devices in a network domain and generates communication rules allowing communication between devices. The contextual information collection module 710 obtains contextual information, which includes device information describing devices (e.g., processes executing on the devices, software installed on the devices, and so on) and communication information describing communication having any of the devices in the administrative domain 160 as an endpoint. The service identification module 715 associates devices with services based on processes executing on the devices and communications between devices. The labeling engine 720 assigns labels to devices.

The rule inference module 730 uses the assigned labels to generate rules describing existing communication in the administrative domain. The rule inference module 730 may specify rules at varying levels of granularity according to preferences specified by an administrator. The rule creation interface 740 presents the assigned labels and communication rules for review and revision by an administrator. The rule creation interface 740 may also present results of tests indicating the effect of rules on network traffic.

In embodiments where a device is a managed device with policy implementation modules 136 installed on the device, the contextual information collection module 710 may receive contextual information collected by the policy implementation module 136 (e.g., by the local state update module 420). In other embodiments, for example, if a device is an unmanaged device without a policy implementation module 136 installed on the device, the contextual information collection module 710 collects contextual information by executing built-in commands of operating systems or other software executing on the device.

The contextual information collection module 710 collects communication information from devices by executing operating system utilities such as the Linux command "netstat." Communication information includes timing, duration, frequency, protocol type, data size (e.g., total size, packet size), or data rate of the attempted communication. Communication information may also describe routing information of communication such as source address (e.g., IP address, port), destination address, and path information (e.g., load balancers and NAT devices routing the communication). Communication information differentiates between network traffic inbound from a device and network communication outbound from a device. The contextual information collection module 710 may collect communication information from devices of the administrative domain 160 multiple times over a time period (e.g., a day, a week) in order to determine typical communication patterns.

The contextual information collection module 710 collects device information describing characteristics of the device using operating system utilities, such as the Linux command "ps" (process snapshot). The contextual information collection module 710 collects contextual information including network exposure information, process information (e.g., process identifier, process owner, processor load), identifiers (e.g., internet protocol (IP) address, media access control (MAC) address, device name, host name), hardware resources (e.g., processor type, processor throughput, total processor load, total memory, available memory, network interface devices, storage device type), software resources (e.g., operating system), or network connectivity of a device.

The device information collected by the contextual information collection module 710 comprises process information and package information, identifiers of the device (e.g., IP address, MAC address, host name), hardware resources, or server type (e.g., physical device, cloud-provided virtual device, virtual machine, Linux container), software information describing the operating system and other software executing or installed on the device.

In an embodiment, a device represents a virtualized or cloud-based server and the contextual information collected by the contextual information collection module 710 comprises environment information, which describes the provider of the server (e.g., a proprietary data center, a third-party private data center, a cloud provider) and the communication protocol (e.g., encapsulation information, network address, network address translation) to communicate with the provider. The contextual information collection module 710 may collect environment information by sending a request to the cloud service provider or the software providing the virtual server for the environment information.

The service identification module 715 determines services associated with a device based on the contextual information collected from the devices by the contextual information collection module 710. In an embodiment, the service identification module 715 stores a catalog of services that maps services with information describing processes executing on devices. In an embodiment, the catalog stores port or communication protocol associated with a service. For example, the service identification module 715 associates a domain name system (DNS) service with a device communicating through TCP or user datagram protocol (UDP) on port number 53. As another example, the service identification module 715 associates the service "openvpn" (associated with a virtual private network (VPN)) with the protocol/port pairs UDP/1194 and TCP/943. The catalog may be stored as a table or in any other suitable data structure to enable efficient searching.

The service identification module 715 groups processes executing on one or more devices into a service according to the catalog. The service identification module 715 retrieves information identifying processes executing on a device, for example, a process name or identifier. The service identification module 715 matches the information identifying a process against entries of the catalog to determine if the process is associated with a service.

The service identification module 715 identifies the ports and protocols used by devices for communications to determine whether the device is a producer or a consumer of a service. For example, the service identification module 715 may determine that a device D1 listening on a particular port is a provider of a service and a device D2 sending communications to device D1 at that particular port is a consumer of the service.

Device Labeling

The labeling engine 720 uses contextual information collected from devices to assign labels to the devices. Assigning a label to a device refers to determining one or more label values for one or more corresponding label dimensions. The labeling engine 720 includes a label mapping module 722, a label feature module 724, a label selection module 725, a device grouping module 727, and a group label assignment module 728. In other embodiments, the some or all of functionality of the modules may be performed by a different combination of modules.

The labeling engine 720 may assign label values using one or more of the following techniques: (a) the label mapping module 722 assigns labels according to conditional heuristics mapping contextual information to label values; (b) the label feature module 724 generates machine learning model features from contextual information, and the label selection module 725 selects a label value for a label dimension from among candidate labels using the machine learning module; or (c) the device grouping module 727 determines groupings of devices from communication information, and the group label assignment module 728 assigns grouped devices common labels across one or more dimensions.

The label mapping module 722 assigns a label based on conditional heuristics that use contextual information. Conditional heuristics include (a) one or more conditions each specifying an item of contextual information and (b) one or more label values and dimensions to assign. The label mapping module 722 searches a repository of conditional heuristics that may apply to a device. The label mapping module 722 determines whether the contextual information associated with a device fulfills the one or more conditions of a conditional heuristic. In response to the contextual information fulfilling a condition, the label mapping module 722 assigns the device the label value and label dimension specified by the conditional heuristic. For example, a conditional heuristic specifies that if a device includes a service associated with PostgreSQL, then the device has a "Database" value for the "Role" label dimension. As another example, a conditional heuristic specifies that if a device's network address is included in a range of network addresses associated with a location, then the device has a particular value for the "Location" label dimension.

Alternatively or in addition to assigning labels using conditional heuristics, the labeling engine 720 may assign labels using machine learning based techniques. Such machine learning-based assignment may assign a label to a device having characteristics similar to another device assigned that label.

The label feature module 724 uses contextual information about a device to generate features for input to a machine learning model that scores candidate label values. From the contextual information, the label feature module 724 generates binary features indicating whether a device has a particular characteristic or whether the device's communications have a particular characteristic. For example, the label feature module 724 outputs a feature indicating whether a device is associated with a service identified by the service identification module 715 or whether the device is executing a particular process indicated by context information. As another example, the label feature module 724 outputs a binary feature indicating whether the device is associated with particular environment information (e.g., whether the device is a virtual device, whether the device is a physical device, whether the device is provided by a cloud computing provider).

The label feature module 724 also generates numerical features quantifying network traffic having the device as an endpoint. For example, the features indicate total or average data transferred through connections, average frequency of establishing connections, average duration of connections, or number of established connections, proportion of network traffic using a given protocol). Such features may include only inbound network traffic, only outbound network traffic, or may include both. The label feature module 724 also generates numerical features quantifying characteristics of the device, such as software characteristics (e.g., number of processes, number of processes owned by a root user), hardware characteristics (e.g., processor utilization rate, total available memory), or connectivity characteristics (e.g., number of listener ports receiving inbound network traffic, number of connecting ports initiating outbound network traffic). Connectivity characteristics of a particular computing device include characteristics of other devices with which the particular computing device communicates.

The label selection module 725 uses the feature values output by the label feature module 724 as input to a machine learning based model that scores candidate label values for a particular label dimension. The label selection module 725 selects one of the candidate label values for a label dimension and assigns the selected label value and label dimension to the device. The label selection module 725 retrieves weights corresponding to the features, the label dimension, and the candidate label value. Such weights are stored on a per-dimension and per-candidate label value basis, so a feature may have a different weight for inferring one label dimension (e.g., "Role") than it would for another label dimension (e.g., "Environment"). Similarly, a weight may have a different weight for one candidate label value (e.g., "Production") than it would for another candidate label value (e.g., "Development"). Some features may have zero weight, indicating that the feature is not used to infer a label value for the label dimension. The label selection module 725 scores candidate label values for the label dimension using a combination of the features weighted by the retrieved weights. The label selection module 725 selects a candidate label value receiving a highest score and assigns the device a label having the selected label value for the label dimension. The label selection module 725 may repeat the process to select label values for multiple label dimensions.

To determine the weights, the label selection module 725 may use any machine learning model or classifier, such as logistic regression, support vector machines, or neural networks. The machine learning model is trained using training data set comprising labels assigned or approved by administrators. The label selection module 725 may determine weights that minimize discrepancy between candidate labels predicted using features values for the labeled machines and the actual label values assigned by administrators. The learning may be done within the administrative domain 160. Alternatively or additionally, anonymized training data (e.g., contextual information and administrator-assigned labels) are sent as to a central repository aggregating training data from a number of different administrative domains 160. Weights are determined using the aggregated training data and sent to the global manager 120, which stores the weights for use in assigning labels to unmanaged devices 140.

In some embodiments, the labeling engine 720 assigns labels to application groups of devices. The device grouping module 727 obtains communication information describing communication between devices in the administrative domain 160. Based on the communication information, the device grouping module 727 groups devices into application groups. An application group is a set of devices having significant volume of communication within the group compared to volume of communication with device external to the group.

In one embodiment, the device grouping module 727 constructs a graph where the nodes represent devices in the administrative domain 160 and where the edges represent communications between the devices. The edges have binary values indicating presence/absence of communication between the nodes or have non-binary values quantifying the volume of communication (e.g., a rate or frequency of communications, a data size of communications, a duration of communications). For example, the value of an edge connecting two nodes is the daily quantity of data exchanged between a two devices corresponding to the two nodes. The graph may be undirected with edges that disregard direction of communication, or the graph may be a directed graph with directed edges according to direction of communication. For example, a directional edge pointing away from a node indicates that the corresponding device is a consumer of a service, and a directional edge pointing towards a node indicates that a corresponding device is the provider of a service.

Using the graph representation of the administrative domain 160, the device grouping module 727 groups the devices into application groups. In one embodiment, the device grouping module 727 partitions the graph into subgraphs each corresponding to an application group. For example, the device grouping module 727 applies a depth-first search, a k-means cluster, or a minimum cut algorithm to partition the graph. In other words, the device grouping module 727 groups the devices into application groups by applying a graphical analysis to communication information gathered by the device information collection module 710.

Using device information in an application group, the group label assignment module 728 assigns a label value for a label dimension to the devices in the application group. Example label values assigned on a per-group basis include labels values for the "Environment," "Application," and "Location" label dimensions. The group label assignment module 728 determines a group-level label value based on an aggregation of device information for devices. To aggregate numerical device information, the group label assignment module 728 averages numerical device information in the application group (or applies another measure of central tendency thereto). To aggregate binary device information, the group label assignment module 728 may determine a proportion of devices in an application group having a characteristic, such as an association with a particular service. The group label assignment module 728 may apply conditional heuristics to the aggregated device information (e.g., by the label mapping module 722) or may use the aggregated device information as input to the machine learning model (e.g., by the label feature module 724 and the label selection module 725).

Rule Inference

The rule inference module 730 uses labels assigned to devices and communication information describing the devices' network traffic to generate rules. The generated rules are specified in terms of the assigned labels and authorize the network traffic occurring in the administrative domain 160 based on the collected device information. In an embodiment, the generated rules are stored as part of one or more administrative domain wide policies 330 as shown in FIGS. 1 and 3. The global manager 120 enforces the one or more administrative domain wide policies 330 using the processes illustrated in FIGS. 5 and 6. The rule inference module 730 includes a default rule module 732, a connection identification module 734, a rule generation module 736, a rule simplification module 738, and a rule grouping module 739. In other embodiments, some or all of functionality of the modules may be performed by a different combination of modules.

The default rule module 732 generates rules based on a catalog of default rules. Default rules authorize communications for a particular service for all devices in the administrative domain 160. Such a default rule specifies "All Devices" or "Wildcard" for the scope, PB, and UB portions of the rule. Example of default rules include a "DNS" rule that specifies the DNS service and allows communication by processes and ports corresponding to the DNS service. Other example default rules include an "Active Directory" service that enables user authentication, an "NTP" (network time protocol) service for time synchronization, a "DHCP" (dynamic host control protocol) service that provides a device with an IP address and other network configuration settings, and an "IPv6 Router Advertisements" service to facilitate router discovery. Default rules ensure that essential services are authorized, thereby obviating generation of such rules by the rule generation module 736. Default rules may have a scope specifying one or more labels. For example, the scope specifies a label value for the "Environment" or "User Group" label dimensions. Such rules authorize services commonly used by devices within the specified scope but not commonly used by devices outside the specified scope.

Such default rules specifying a scope provide improved granularity and security over default rules with unlimited scope.

The connection identification module 734 obtains communication information collected by contextual information collection modules 710 as part of the contextual information. The communication information describes communications having any of the devices in the administrative domain 160 as an endpoint. The connection identification module 734 outputs a set of directional connections having the devices as endpoints and specifying the service associated with the connection. The connection identification module 734 uses the services identified by the service identification module 715. The connection identification module 734 determines which device is providing the service by listening on a network port and which device is consuming the service by connecting to the other device through a network port. Thus, the directional connection specifies a service, a provider, and a consumer. A directional connection is also referred to herein as a relation or a directional relation. If two devices have network traffic generated by multiple services, then the connection identification module 734 outputs multiple directional connections between them. In some embodiments, the connection identification module 734 may apply thresholds and filter connections corresponding to less than a threshold level of data volume, connection duration, or connection frequency.

The rule generation module 736 uses labels from the labeling engine 720 to generate rules authorizing the identified directional connections. The rule generation module 736 writes a rule corresponding to an identified directional connection by retrieving labels corresponding to the provider of the connection and the consumer of the connection. If the provider and the consumer have common label values for a label dimension, then the rule generation module 736 uses the common label value and label dimension as a scope for the rule. The scope of a rule identifies the entities of the network domain to which the rule is applicable, the entities comprising devices, users, processes, ports, and so on. If the provider and the consumer have different label values for a label dimension, then the rule generation module 736 uses the label dimension for the PB and UB portions of the rule. The label value of the provider is used for the PB portion, and the label value of the consumer is used for UB portion. Thus, the resulting rule specified the service of the connection, a scope, and a PB or UB portion.

For example, the rule generation module 736 determines that a connection corresponds to devices having common label values for the "Environment," "Application," and "Location" dimensions but different values for the "Role" dimension. As a result, the rule generation module 736 uses the label values for the "Environment," "Application," and "Location" dimensions for the scope value and the respective label values for the "Role" dimension for the PB and UB portions.

The generated rules may be written at varying levels of granularity according to a granularity preference specified by a network administrator. The rule generation module 736 may omit some label dimensions from a rule or further specify device information in the rule depending on the granularity preference. One example granularity preference causes the rule generation module 736 to ignore label dimensions that differ within an application group (e.g., the "Role" and "User Group" dimensions), so the corresponding rules only specify label values for group-level labels (e.g., "Environment," "Application," "Location"). Another example granularity preference causes the rule generation module 736 to include the labels dimensions that differ within the application group, such as one or more of "Role," "Line of Business," "User Group," or a combination thereof. A third example granularity preferences specifies that the rule generation module 736 include the port, protocol, or process responsible for a communication in the PB, UB, or service portion of the rule. As the level of granularity increases, the security provided by the rule increases because the rule will cover fewer connections besides the connection used to generate the rule. On the other hand, a reduced level of granularity reduces the complexity of the set of rules by reducing the number of rules to authorize routine communication within the administrative domain 160.

The rule generation module 736 may also generate inter-group rules corresponding to communication between application groups. An inter-group rule has a scope that applies only to the provider device of a service. For example, a rule may have a scope portion specifying the labels <Application, Human Resources>, <Environment, Production>, and <Location, US>. The example rule has a PB portion specifying <Role, Database> and a UB portion specifying <Role, Database>, <Application, Enterprise Resource Planning>, <Environment, Staging>, and <Location, Europe>. The labels specified in the UB portion override the labels along the same dimension in the scope portion. To generate an inter-group rule, the rule generation module 736 assigns group-level labels of the provider device to the scope portion and group-level labels of the consumer device to the UB portion. The rule generation module 736 may include additional labels in the UB portion and PB portion of the generated rule depending on the level of granularity specified by the administrator, as described above.

The rule simplification module 738 takes as input a set of rules generated by the rule generation module 736 and removes rules obviated by other rules in the set. The rule simplification module 738 removes specific rules from the set that are obviated by one or more general rules in the set. A specific rule is obviated by a general rule if all communication authorized by the specific rule is also authorized by the general rule. For example, the rule simplification module 738 identifies (a) a general rule with a scope portion specifying a set of label values and (b) a specific rule with a scope portion specifying the same set of label values as the general rule as well as additional label values for additional label dimensions. In the example, the general rule covers all the label values for the additional dimensions, so the general rule obviates the specific rule. Simplifying the set of rules facilitates review and revision by an administrator. Alternatively, the rule generation module 736 checks whether a connection is authorized by a generated rule before generating a rule to authorize the connection to improve computational efficiency. In some embodiments, the rule simplification module 738 sends recommendations of proposed simplifications to an administrator through the rule creation interface 740 rather than performing rule simplification automatically. In some instances, the rule simplification module 738 receives a request from administrators to use un-simplified rules, for example, by managing different specific rules that could be obviated by general rule. As another example, the rule simplification module 738 may increase the granularity of the rules based on requests from an administrator (e.g., requests to specify additional labels or rule conditions).

The rule grouping module 739 takes as input the simplified set of rules and groups the simplified rules into rule sets. The rule grouping module 739 may identify rules corresponding to an application group and group those rules into a rule set. For example, the rule grouping module 739 identifies rules specifying common label values for the label dimensions used in a group-level label set (e.g., "Environment," "Application," "Location"). The rule grouping module 739 outputs rule lists identifying rules applicable to an application group. Some rules may be applicable to more than one application group (e.g., default rules), so these rules may be listed by multiple rule sets.

The rule creation interface 740 provides an administrator an interface for reviewing device information, label sets assigned to devices, and generated communication rules. The rule creation interface 740 may receive a corrected label value for a device from an administrator. In response, the rule creation interface 740 modifies the label value for the label assigned to the device. If the modified label value is for a label dimension shared with an application group (i.e., a group-level label), the rule creation interface 740 may further modify the label value for other devices in the application group. Additionally, the rule creation interface 740 prompts the rule generation module 736 to update communication rules generated for the device in order to reflect the updated label value for the device. The rule creation interface 740 may prompt an administrator to select a level of granularity for generating rules. In response to receiving a change in the level of granularity, the rule creation interface 740 prompts the rule generation module 736 to update the generated rules to reflect the specified level of granularity.

The rule creation interface 740 may support multiple modes of operation. In a test mode, the rule creation interface 740 presents communications between devices in the administrative domain 160 and illustrates whether those communications would be allowed or blocked based on the generated rules. In the test mode, the administrator may modify, remove, or add rules and view the simulated result of a rule change on communication. The rule creation interface 740 may enable an administrator to change the mode of operation to an enforcement mode. In an enforcement mode, policy implementation modules 136 are sent management instructions corresponding to the generated (and revised) communication rules and instructed to block communication not in compliance with the rules.

Various embodiments generate communication rules that regulate communications associated with entities of the network domain, for example, processes, users, ports, or servers. Accordingly, a communication rule may specify labels identifying one or more entities and regulate communications associated with the one or more entities. For example, a communication rule may specify that the consumer of a service is a user or users of a particular user group. Accordingly, the communication rule regulates all communications from that user or users of that group that are related to that service. Similarly, a communication rule may specify a provider of a service to be one or more processes. Accordingly, the communication rule regulates all communications to those one or more processes. A communication rule may identify a provider of a service to be a particular port or a port/process combination. The connection identification module 734 identifies relations between entities representing endpoints that can be any one of a user, a process, a port, a server or any other entity of a network domain that can act as an endpoint of a communication. The rule generation module 736 generates rules based on labels identifying the entities representing the endpoints of the communications to generate the communications associated with the endpoints. The labels of the rule may identify multiple entities, for example, a process associated with a user.

Overall Process for Generating Rules Based on Labels

Figure 8:
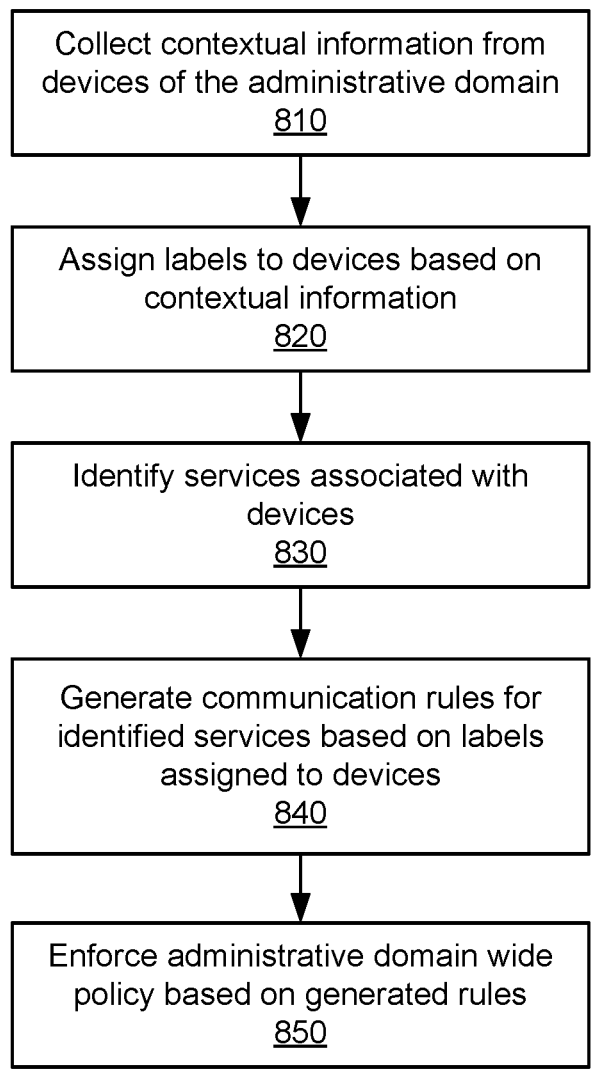
FIG. 8 is a flowchart illustrating the overall process for generating rules, according to one embodiment.

FIG. 8 is a flowchart illustrating the overall process for generating rules, according to one embodiment. Other embodiments can perform the steps in different orders and can include different and/or additional steps. In addition, some or all of the steps can be performed by entities other than those shown in FIG. 8.

The contextual information collection module 710 collects 810 contextual information from devices in an administrative domain. The collected contextual information includes device information, communication information, environment information, and so on.

The labeling engine 710 assigns 820 labels to devices based on the collected contextual information. For example, the labeling engine 710 extracts features based on the collected contextual information and either determines the labels based on a weighted aggregate value based on the features or using a machine learning based model.

The service identification module 715 identifies 830 services associated with the devices of the administrative domain. The service identification module 715 uses contextual information, for example, processes executing on devices, port and protocols used by devices for communication to associated services with devices.

The communication rule creation module 390 generates 840 communication rules for the services identified. The communication rules are based on labels assigned 820 to the devices. In an embodiment, the communication rule creation module 390 associates the generated rules with an administrative domain wide policy 330. The global manager 120 enforces 850 the administrative domain wide policy 330 associated with the generated rules across the devices of the administrative domain.

Labeling Devices

Figure 9:
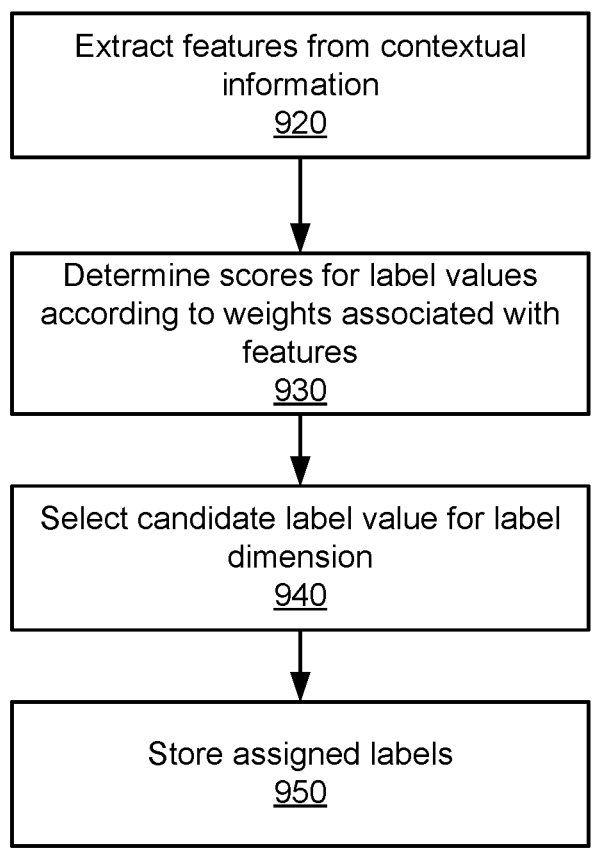
FIG. 9 is a flowchart illustrating a process for assigning labels to devices, according to one embodiment, according to one embodiment.

FIG. 9 is a flowchart illustrating a process for assigning 820 labels to devices, according to one embodiment. Other embodiments can perform the steps in different orders and can include different and/or additional steps. In addition, some or all of the steps can be performed by entities other than those shown in FIG. 9.

The label engine 720 extracts 920 from the contextual information collected 810 by the contextual information collection module 710. The features include numerical feature quantifying a characteristic of a device or network traffic as well as binary features indicating whether a device or network traffic has a particular characteristic.

The label engine 720 determines 930 scores for candidate label values of a label dimension by combining the features according to weights that are specific to the label dimension, the candidate label value, and the feature. In an embodiment, the candidate label values are combined according to a machine learning model that classifies whether the candidate label value corresponds to the contextual information. The score indicates the extent to which the candidate label value matches the contextual information.

The label engine 720 selects 940 one of the candidate labels for the label dimension according to the scores determined for the candidate label values. For example, the score corresponds to a likelihood of the candidate label value matching the contextual information, so the highest scoring candidate label is selected. Step 940 is performed, for example, by the label selection module 725.

The label engine 720 stores 950 the selected label value and label dimension in association with the device.

Generating Communication Rules

Figure 10:
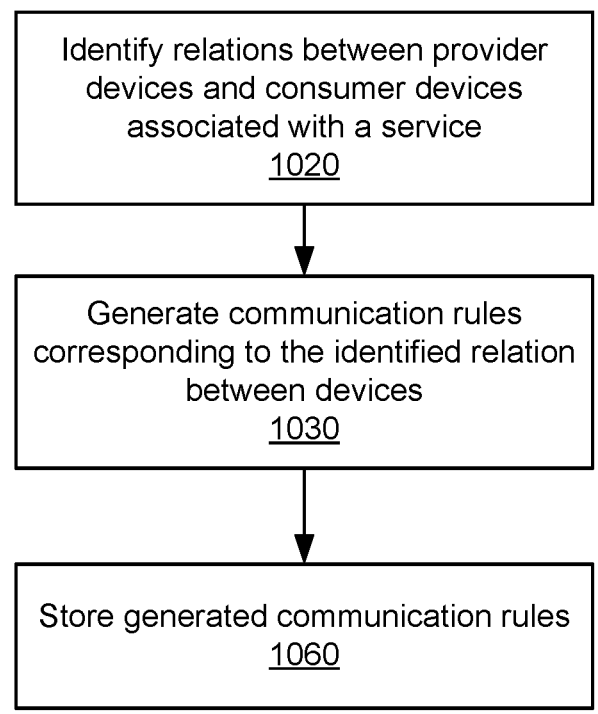
FIG. 10 is a flowchart illustrating a method of generating communication rules for a device, according to one embodiment.

FIG. 10 is a flowchart illustrating a method 1000 of generating communication rules for a device, according to one embodiment. Other embodiments can perform the steps in different orders and can include different and/or additional steps. In addition, some or all of the steps can be performed by entities other than those shown in FIG. 10.

The communication rules creation module 390 identifies 1020 relations among devices associated with services. For example, the communication rules creation module 390 determines various devices associated with a service, for example, provider device and consumer device. The communication rules creation module 390 establishes a relation specifying the service responsible for a network traffic, a device providing the service, and a device consuming the service. Optionally, the relation indicates a port and protocol used as well as one or more processes.

The communication rules creation module 390 generates 1030, rules corresponding to the established relations. The rules identify the service corresponding to the directed connection and label values identifying the provider in a PB portion, the consumer in a UB portion, or both in a scope portion. The rule may optionally specify additional device information related to the communication such as one or more associated ports, protocol, or process.

The communication rules creation module 390 may optionally simplify the set of generated rules to remove duplicate rules and specific rules obviated by general rules. The communication rules creation module 390 may also optionally group rules into rule sets corresponding to application groupings identified, e.g., by the application grouping module 727.

The communication rules creation module 390 stores 1060, the generated rules (and rule set groupings, if applicable).

Following example illustrates the above process of generating rules. As an example, the communication rules creation module 390 may identify a web service and a set of devices that provide the web service and a set of devices that are consumers of the web service. The communication rules creation module 390 identifies labels that characterize the provider devices and labels that characterize the consumer devices. The communication rules creation module 390 generates a rule for the web service that specifies the labels that characterize the provider devices as the provided-by portion of the rule and the set of labels that characterize the consumer devices as the used-by portion of the rule. The global manager 120 may provide the generated rule to an administrator for approval. The administrator may modify the generated rule if necessary. The global manager 120 enforces the generated rule across devices of the administrative domain as described in the processes illustrated in FIGS. 5 and 6.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

Alternative Applications

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for regulating network traffic of a network domain comprising a plurality of computing devices, the method comprising:

for each of one or more computing devices, assigning respective label sets each comprising one or more labels to the one or more computing devices, the assigning comprising, determining a label value for a label dimension of a computing device based on one or more features describing characteristics of the computing device;

obtaining communication information describing characteristics of monitored network traffic observed between the plurality of computing devices in the network domain in which at least one of the plurality of computing devices is an endpoint;

identifying, by a processor, a relation between a consumer computing device having a first label set and a provider computing device having a second label set based on the obtained communication information, the relation indicating that the consumer computing device is a consumer of a service offered by the provider computing device;

generating, by the processor, a communication rule for regulating communications of the network domain based on the obtained communication information, the communication rule permitting connections between first computing devices having the first label set associated with the provider computing device and second computing devices having the second label set associated with the consumer computing device; and enforcing an administrative domain wide policy regulating communications between the plurality of computing devices based on the generated communication rule.

2. The method of claim 1, wherein enforcing the administrative domain wide policy comprises:

generating management instructions based on the communication rule;

identifying one or more relevant computing devices for the communication rule; and sending, to the one or more relevant computing devices, the management instructions to configure the one or more relevant computing devices to implement the communication rule.

3. The method of claim 1, wherein the communication rule comprises a scope, the method further comprising:

identifying a label dimension such that the provider computing device and the consumer computing device have a common label value for the identified label dimension; and specifying the scope of the communication rule based on the common label value and the identified label dimension.

4. The method of claim 1, wherein the communication rule comprises a provided-by portion and a used-by portion, the method further comprising:

identifying a provider label of the provider computing device and a consumer label of the consumer computing device, the provider label having a different label value from the consumer label along a same label dimension; and wherein generating the communication rule comprises specifying the provided-by portion identifying the provider label and the used-by portion identifying the consumer label.

5. The method of claim 1, wherein identifying the relation between the consumer computing device and the provider computing device comprises:

determining that a first computing device is the provider computing device responsive to determining that the first computing device is listening on a network port; and determining that a second computing device is the consumer computing device responsive to determining that the second computing device connects to the first computing device through the network port.

6. The method of claim 1, further comprising:

identifying an entity associated with one or more of the consumer computing device or the provider computing device, wherein the entity is one of: a port, a process, a user, or a server; and wherein the one or more labels specified for the communication rule comprise a label describing the entity, wherein the communication rule is configured to regulate communications associated with the entity.

7. The method of claim 1, wherein determining the label value for the label dimension based on one or more features describing characteristics of the computing device comprises:

executing a machine learning model configured to generate a score associated with the label value for the label dimension based on the one or more features describing the computing device, wherein the machine learning model was trained using training data set comprising example computing devices and label values for label dimensions for the example computing devices.

8. The method of claim 1, wherein determining the label value for the label dimension comprises:

retrieving sets of weights corresponding to the one or more features and combining the one or more features according to the sets of weights to determine the label value for the label dimension.

9. The method of claim 8, wherein each set of weights corresponds to one of a plurality of candidate label values for the computing device along the label dimension, wherein determining the label value for the label dimension comprises:

for each of the plurality of candidate label values for the computing device, determining a score by combining the features according to the set of weights associated with the candidate label value;

selecting one of the candidate label values for the label dimension based on the determined scores; and providing the selected candidate label value as the determined label value for the label dimension.

10. The method of claim 1, wherein the one or more features comprise a feature describing one of: a software characteristic of the computing device, a hardware characteristic of the computing device, or a connectivity characteristic of the computing device.

11. The method of claim 10, wherein the software characteristic of the computing device comprises one or more of: information describing a process executing on the computing device or information describing a software installed on the computing device.

12. The method of claim 10, wherein the hardware characteristic of the computing device comprises one or more of: a processor utilization rate or a size of available memory on the computing device.

13. The method of claim 10, wherein the connectivity characteristic of the computing device comprises an aggregate value based on network traffic associated with the computing device, the aggregate value comprising one or more of: an amount of data transferred in the network traffic, a frequency of establishing connections, a measure of duration of connections, a number of connections, or one or more characteristics of other computing devices with which the computing device communicates.

14. The method of claim 1, further comprising:

receiving a granularity preference specifying one or more label dimensions and instructions for performing one of: including the specified one or more label dimensions for the communication rule or excluding the specified one or more label dimensions for the communication rule; and determining the one or more labels for the generated communication rule in accordance with the granularity preference.

15. The method of claim 1, further comprising, grouping rules into rule lists, the grouping comprising:

identifying a set of label dimensions;
identifying rules having common label values for the identified set of label dimensions; and
grouping the identified rules as a rule list, wherein the administrative domain wide policy enforces the rules of the rule list.

16. The method of claim 1, wherein the communication rule is a first communication rule, the method further comprising:
generating a second communication rule;
determining whether all communications authorized by the first communication rule are also authorized by the second communication rule; and
responsive to determining that all communications authorized by the first communication rule are also authorized by the second communication rule removing the first communication rule from a set of communication rules enforced by the administrative domain wide policy.

17. The method of claim 1, further comprising:
sending information describing the generated communication rule for presentation; and
receiving a modification to the generated communication rule, wherein enforcing an administrative domain wide policy comprises enforcing the modified communication rule.

18. A non-transitory computer readable storage medium storing executable instructions for:
for each of one or more computing devices of a plurality of computing devices, assigning respective label sets each comprising one or more labels to the one or more computing devices, the assigning comprising, determining a label value for a label dimension of a computing device based on one or more features describing characteristics of the computing device;
obtaining communication information describing characteristics of monitored network traffic observed between the plurality of computing devices in the network domain in which at least one of the plurality of computing devices is an endpoint;
identifying a relation between a consumer computing device having a first label set and a provider computing device having a second label set based on the obtained communication information, the relation indicating that the consumer computing device is a consumer of a service offered by the provider computing device;
generating a communication rule for regulating communications of the network domain based on the obtained communication information, the communication rule permitting connections between first computing devices having the first label set associated with the provider computing device and second computing devices having the second label set associated with the consumer computing device; and
enforcing an administrative domain wide policy regulating communications between the plurality of computing devices based on the generated communication rule.

19. The non-transitory computer readable storage medium of claim 18, wherein the instructions for determining the label value for the label dimension based on one or more features describing characteristics of the computing device further comprise instructions for:
executing a machine learning model configured to generate a score associated with the label value for the label dimension based on the one or more features describing the computing device, the machine learning model trained using training data set comprising example computing devices and label values for label dimensions for the example computing devices.

20. A computer system comprising:
one or more processors; and
a non-transitory computer readable storage medium storing executable instructions for:
for each of one or more computing devices of a plurality of computing devices, assigning respective label sets each comprising one or more labels to the one or more computing devices, the assigning comprising, determining a label value for a label dimension of a computing device based on one or more features describing characteristics of the computing device;
obtaining communication information describing characteristics of monitored network traffic observed between the plurality of computing devices in the network domain in which at least one of the plurality of computing devices is an endpoint;
identifying a relation between a consumer computing device having a first label set and a provider computing device having a second label set based on the obtained communication information, the relation indicating that the consumer computing device is a consumer of a service offered by the provider computing device;
generating a communication rule for regulating communications of the network domain based on the obtained communication information, the communication rule permitting connections between first computing devices having the first label set associated with the provider computing device and second computing devices having the second label set associated with the consumer computing device; and
enforcing an administrative domain wide policy regulating communications between the plurality of computing devices based on the generated communication rule.

* * * * *